(12) United States Patent
Humfeld et al.

(10) Patent No.: US 10,960,631 B2
(45) Date of Patent: Mar. 30, 2021

(54) FORMING CONTOURED ELONGATE COMPOSITE STRUCTURES

(71) Applicant: The Boeing Company, Chicago, IL (US)

(72) Inventors: Keith Daniel Humfeld, Federal Way, WA (US); Joseph Andrew Bolton, Newalla, OK (US)

(73) Assignee: The Boeing Company, Chicago, IL (US)

( * ) Notice: Subject to any disclaimer, the term of this patent is extended or adjusted under 35 U.S.C. 154(b) by 155 days.

(21) Appl. No.: 16/113,987

(22) Filed: Aug. 27, 2018

(65) Prior Publication Data

US 2020/0061947 A1    Feb. 27, 2020

(51) Int. Cl.
| | | |
|---|---|---|
| *B29D 99/00* | (2010.01) | |
| *B64F 5/10* | (2017.01) | |
| *B29C 70/30* | (2006.01) | |
| *B29C 70/50* | (2006.01) | |
| *B29C 70/54* | (2006.01) | |
| *B64C 1/06* | (2006.01) | |
| *B64C 3/18* | (2006.01) | |

(Continued)

(52) U.S. Cl.
CPC .......... *B29D 99/0014* (2013.01); *B29C 70/30* (2013.01); *B29C 70/504* (2013.01); *B29C 70/545* (2013.01); *B29D 99/0007* (2013.01); *B64C 1/064* (2013.01); *B64C 3/182* (2013.01); *B64F 5/10* (2017.01); *B29L 2031/3082* (2013.01); *B64C 2001/0072* (2013.01)

(58) Field of Classification Search
CPC ... B29D 99/0014; B29D 99/0007; B64F 5/10; B29C 70/30; B29C 70/504; B29C 70/545; B29C 33/308; B29C 70/386; B29C 70/388; B29C 53/22; B29C 45/376; B29L 2031/3082; B64C 2001/0072; B64C 1/064; B64C 3/182; Y02T 50/40

See application file for complete search history.

(56) References Cited

U.S. PATENT DOCUMENTS

| | | | | |
|---|---|---|---|---|
| 4,151,031 A | * | 4/1979 | Goad ................ | B29C 66/91645 156/201 |
| 4,186,044 A | * | 1/1980 | Bradley ................ | B29C 43/224 156/275.5 |

(Continued)

OTHER PUBLICATIONS

"Conveyor Idlers," Jimway Enterprise Co., Ltd., 2018, accessed Aug. 27, 2018, 4 pages. https://www.roller.com.tw/conveyor-idlers.htm.

*Primary Examiner* — Michael N Orlando
*Assistant Examiner* — Abhishek A Patwardhan
(74) *Attorney, Agent, or Firm* — Yee & Associates, P.C.

(57) ABSTRACT

A composite structure forming system configured to form a contoured elongate composite structure in a continuous process is presented. The composite structure forming system comprises a plurality of charge forming stations and a plurality of conveyor systems. The plurality of charge forming stations is configured to operate in parallel, each charge forming station of the plurality of charge forming stations is configured to form a respective composite charge of the contoured elongate composite structure. Each conveyor system of the plurality of conveyor systems is configured to transport a respective composite charge through a respective charge forming station.

23 Claims, 23 Drawing Sheets

(51) Int. Cl.
 *B29L 31/30* (2006.01)
 *B64C 1/00* (2006.01)

(56) References Cited

U.S. PATENT DOCUMENTS

| | | | | |
|---|---|---|---|---|
| 5,066,352 | A * | 11/1991 | Albers | B26F 1/38 |
| | | | | 156/264 |
| 5,228,944 | A * | 7/1993 | Seifried | B29C 70/32 |
| | | | | 156/197 |
| 9,573,310 | B1 * | 2/2017 | Archuletta | B29C 48/0021 |
| 2005/0023728 | A1 * | 2/2005 | Benson | B29C 70/388 |
| | | | | 264/258 |
| 2009/0266468 | A1 * | 10/2009 | Pilpel | B29C 66/83413 |
| | | | | 156/60 |
| 2010/0024971 | A1 * | 2/2010 | Benson | B29C 70/32 |
| | | | | 156/245 |
| 2012/0312471 | A1 * | 12/2012 | Harbaugh | B32B 38/0004 |
| | | | | 156/322 |
| 2015/0367584 | A1 * | 12/2015 | Daton-Lovett | B29C 70/52 |
| | | | | 264/171.13 |

\* cited by examiner

FORMING CONTOURED ELONGATE COMPOSITE STRUCTURES

BACKGROUND INFORMATION

1. Field

The present disclosure relates generally to forming composite structures and more specifically to forming elongate composite structures. Yet more specifically, the present disclosure presents methods and apparatuses for forming and transporting contoured elongate composite stringers.

2. Background

Uncured composite structures with complex geometries are formed of at least one uncured composite charge. When more than one uncured composite charge is joined to form an uncured composite structure, each uncured composite charge is separately laid up and transported. Some large composite structures are undesirably difficult to manufacture. Some large composite structures are undesirably time-consuming to manufacture. In some illustrative examples, manufacturing large composite structures uses an undesirable amount of manufacturing floor space.

Therefore, it would be desirable to have a method and apparatus that takes into account at least some of the issues discussed above, as well as other possible issues. For example, it would be desirable to have an apparatus for laying up composite charges that reduces manufacturing time. As another example, it would be desirable to have an apparatus that reduces a footprint for laying up composite structures in a manufacturing environment.

SUMMARY

An illustrative embodiment of the present disclosure provides a composite structure forming system configured to form a contoured elongate composite structure in a continuous process. The composite structure forming system comprises a plurality of charge forming stations and a plurality of conveyor systems. The plurality of charge forming stations is configured to operate in parallel, each charge forming station of the plurality of charge forming stations is configured to form a respective composite charge of the contoured elongate composite structure. Each conveyor system of the plurality of conveyor systems is configured to transport a respective composite charge through a respective charge forming station.

Another illustrative embodiment of the present disclosure provides a system configured to form a composite charge having a plurality of plies of composite tape in a continuous process. The system comprises a charge forming station and a conveyor system. The charge forming station comprises a plurality of composite tape laying heads in series. The conveyor system comprises a conveyor belt extending through the charge forming station and a plurality of support rollers configured to provide support to the conveyor belt.

Another illustrative embodiment of the present disclosure provides a method of forming a contoured elongate composite structure using a composite structure forming system. A plurality of composite charges is formed simultaneously the plurality of composite charges each comprising a plurality of plies of composite tape. The plurality of composite charges is joined to form the contoured elongate composite structure in a continuous process. The contoured elongate composite structure is expelled from the composite structure forming system after joining the plurality of composite charges.

A further illustrative embodiment of the present disclosure provides a contoured elongate composite structure receipt and transportation system. The contoured elongate composite structure receipt and transportation system comprises a structural frame, a plurality of moveable supports, a plurality of displacement systems, and a movement system. The plurality of displacement systems connects the plurality of moveable supports to the structural frame and is configured to move the plurality of moveable support rollers vertically relative to the structural frame. The movement system is connected to a base of the structural frame.

Yet another illustrative embodiment of the present disclosure provides a method of receiving and supporting a contoured elongate composite structure on a contoured elongate composite structure receipt and transportation system. A leading edge of a contoured elongate composite structure is received on a conveyor belt of a contoured elongate composite structure receipt and transportation system. The conveyor belt is advanced across a plurality of moveable support rollers of the contoured elongate composite structure receipt and transportation system while the conveyor belt receives the contoured elongate composite structure. The plurality of moveable support rollers is moved vertically relative to a structural frame of the contoured elongate composite structure receipt and transportation system to support a contour of the contoured elongate composite structure as the conveyor belt moves across the plurality of moveable support rollers.

A further illustrative embodiment of the present disclosure provides a method of handling a contoured elongate composite structure. A contoured elongate composite structure is expelled from a composite structure forming system. The contoured elongate composite structure is received on a contoured elongate composite structure receipt and transportation system as the contoured elongate composite structure is expelled from the composite structure forming system.

Another illustrative embodiment of the present disclosure provides a composite structure forming system configured to form a contoured elongate composite structure in a continuous process. The composite structure forming system comprises a base charge forming station, a base charge conveyor system, a secondary charge forming station, a second charge conveyor system, a composite noodle extrusion system, and a structure assembly region. The base charge forming station has a first plurality of composite tape laying heads in series. The base charge conveyor system has a base charge conveyor belt extending through the base charge forming station and beneath the first plurality of composite tape laying heads. The secondary charge forming station has a second plurality of composite tape laying heads in series. The second charge conveyor system has a second charge conveyor belt extending through the secondary charge forming station and beneath the second plurality of composite tape laying heads. The structure assembly region comprises a compaction roller configured to compact a base charge to adhere the base charge to a second charge and a composite noodle, the second charge conveyor belt extending through the structure assembly region.

A yet further illustrative embodiment of the present disclosure provides a method of forming and transporting a contoured elongate composite structure within a manufacturing environment. A contoured elongate composite structure is formed in a continuous process by a composite structure forming system. The contoured elongate composite structure is received by a contoured elongate composite structure receipt and transportation system. The contoured elongate composite structure is transported within a manufacturing environment by moving the contoured elongate composite structure receipt and transportation system within the manufacturing environment.

A further illustrative embodiment of the present disclosure provides a method of forming an elongate composite charge in a continuous process, the elongate composite charge having a plurality of composite plies. A plurality of composite plies is laid down on top of each other in a stepwise fashion, wherein multiple plies of the plurality of composite plies are laid down simultaneously.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
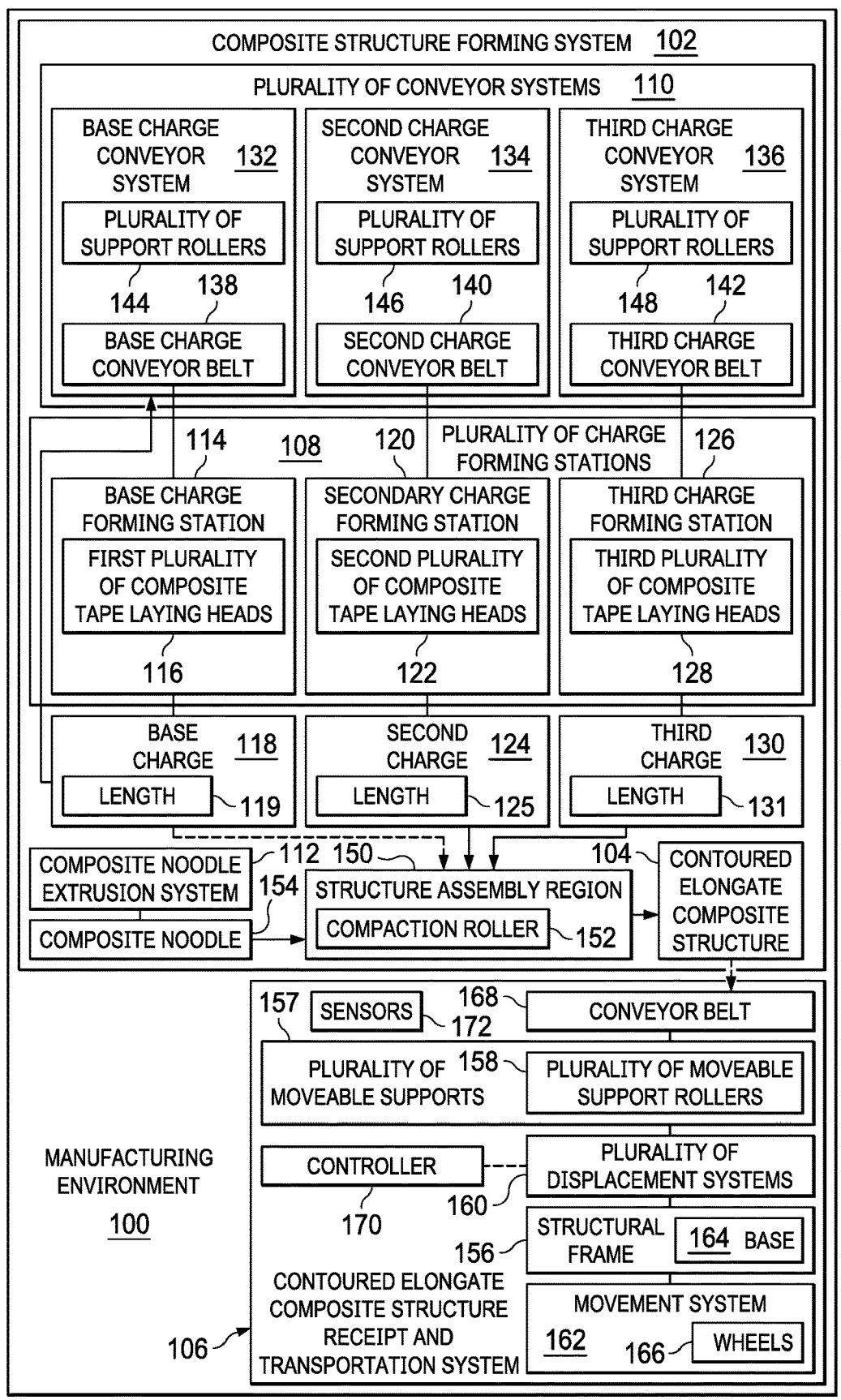
FIG. 1 is an illustration of a block diagram of a manufacturing environment in which a contoured elongate composite structure is manufactured in accordance with an illustrative example.

The illustrative embodiments recognize and take into account one or more different considerations. For example, the illustrative embodiments recognize and take into account that composite materials are tough, light-weight materials created by combining two or more functional components. Composite materials are used in a variety of platforms including aircraft, cars, boats, and other types of platforms. Composite materials are used to increase or maintain strength of a platform while decreasing the weight. Decreased weight may improve performance features such as fuel efficiency. Composite materials are laid up layer-by-layer to form an uncured charge.

A composite material may include reinforcing fibers bound in polymer resin matrix. The illustrative embodiments recognize and take into account that the fibers may be unidirectional or may take the form of a woven cloth or fabric. The fibers and resins are arranged and cured to form a composite material.

The illustrative embodiments recognize and take into account that using composite materials to create aerospace composite structures potentially allows for portions of an aircraft to be manufactured in larger pieces or sections. For example, a fuselage in an aircraft may be created in cylindrical sections and then assembled to form the fuselage of the aircraft. Other examples include, without limitation, wing sections joined to form a wing or stabilizer sections joined to form a stabilizer.

The illustrative embodiments recognize and take into account that in manufacturing composite structures, layers of composite material are typically laid up on a tool. The illustrative embodiments recognize and take into account that the layers may be comprised of fibers in sheets. These sheets may take the form of fabrics, tape, tows, or other suitable forms. The illustrative embodiments recognize and take into account that in some cases, resin may be infused or preimpregnated into the sheets. These types of sheets are commonly referred to as prepreg.

The illustrative embodiments recognize and take into account that the different layers of prepreg may be laid up in different orientations and different quantities of layers may be used depending on the thickness of the composite structure being manufactured. These layers may be laid up by hand or using automated lamination equipment such as a tape laminating machine or a fiber placement system.

The illustrative embodiments recognize and take into account that after the different layers of composite material have been laid up, the layers of composite material may be cured upon exposure to at least one of elevated temperature or elevated pressure. The illustrative embodiments recognize and take into account that composite charges cured together may be referred to as "co-cured" or "co-bonded." Composite charges cured while in contact form a composite structure bonded by the resin of the composite structure.

The illustrative embodiments recognize and take into account that stringers of an aircraft may be formed of composite material. The illustrative embodiments recognize and take into account that stringers run along the inside of the composite skin of an aircraft. The illustrative embodiments recognize and take into account that stringers in an aircraft wing may run the length of the wing on each the upper and lower panels of the wing.

The illustrative embodiments recognize and take into account that to form a composite stringer a tape laying machine, such as a robot arm on a gantry, sweeps back and forth across the length of a specific stringer tool to lay down one composite ply at a time. The illustrative embodiments recognize and take into account that conventional tape laying machines may be undesirable expensive. The illustrative embodiments recognize and take into account that the conventional tape laying machines may take an undesirably long time to perform this task.

The result is a single charge, such as the forward charge of the stringer. This is then moved, for instance using a crane, next to another such charge. For a blade stringer, composite charges are placed next to each other, a formerly extruded noodle is placed in position, and the base charge is laid on top. The illustrative embodiments recognize and take into account that conventional methods of manufacturing a blade stringer take at least one of an undesirable amount of time, an undesirable amount of space, or an undesirable amount of equipment.

The illustrative embodiments recognize and take into account that continuous forming machines form longitudinally straight structures without longitudinal contours. The illustrative embodiments recognize and take into account that in conventional manufacturing, a straight stringer is formed into a longitudinal contour for a specific location after the straight stringer is formed. The illustrative embodiments recognize and take into account that forming straight stringers into longitudinal contours may undesirably introduce inconsistencies, such as wrinkling during shaping into desired contour.

The illustrative embodiments recognize and take into account that it would be desirable to create a contour of the desired stringer installation in the stringer during cross sectional fabrication. The illustrative embodiments recognize and take into account that different stringers along a structure, such as an aircraft wing, may each have a different contour dependent upon a respective location for the stringer across the structure. The illustrative embodiments recognize and take into account that it would be desirable to present an apparatus with the flexibility to manufacture different cross-sections and different contours.

Turning now to the Figures, and more specifically to FIG. 1, an illustration of a block diagram of a manufacturing environment in which a contoured elongate composite structure is manufactured is depicted in accordance with an illustrative example. Manufacturing environment 100 has composite structure forming system 102 configured to form contoured elongate composite structure 104 in a continuous process. Contoured elongate composite structure 104 is expelled from composite structure forming system 102 in an uncured state. Contoured elongate composite structure 104 may be referred to as an uncured composite structure or a composite preform.

Manufacturing environment 100 also has contoured elongate composite structure receipt and transportation system 106 to receive contoured elongate composite structure 104. Contoured elongate composite structure receipt and transportation system 106 receives contoured elongate composite structure 104 as it is expelled from composite structure forming system 102.

Contoured elongate composite structure 104 takes any desirable form. In some illustrative examples, contoured elongate composite structure 104 is a stringer. In some illustrative examples, contoured elongate composite structure 104 is a blade stringer. In some illustrative examples, contoured elongate composite structure 104 is a plank stringer. In some illustrative examples, composite structure forming system 102 may be referred to as a Continuous Composite Stringer Machine (CCSM).

Composite structure forming system 102 comprises plurality of charge forming stations 108, and plurality of conveyor systems 110. In some illustrative examples, composite structure forming system 102 also comprises composite noodle extrusion system 112.

Plurality of charge forming stations 108 is configured to operate in parallel. Each charge forming station of plurality of charge forming stations 108 is configured to form a respective composite charge of contoured elongate composite structure 104. Each conveyor system of plurality of conveyor systems 110 is configured to transport a respective composite charge through the respective charge forming station. Each composite charge is an uncured composite charge. In some illustrative examples, the uncured composite charges may be referred to as composite preforms.

In some illustrative examples, each charge forming station of plurality of charge forming stations 108 comprises a respective plurality of composite tape laying heads in series. As depicted, plurality of charge forming stations 108 includes base charge forming station 114, secondary charge forming station 120, and third charge forming station 126.

For example, base charge forming station 114 has first plurality of composite tape laying heads 116. First plurality of composite tape laying heads 116 is positioned in series to form base charge 118. First plurality of composite tape laying heads 116 includes any desirable quantity of composite tape laying heads. In some illustrative examples, first plurality of composite tape laying heads 116 comprises between 40 and 50 tape laying heads. In some illustrative examples, first plurality of composite tape laying heads 116 comprises fewer than 40 tape laying heads. In some illustrative examples, first plurality of composite tape laying heads 116 comprises greater than 50 tape laying heads.

Base charge 118 is formed in a continuous process by first plurality of composite tape laying heads 116 laying down composite material in a simultaneous process. Each respective composite tape laying head of first plurality of composite tape laying heads 116 is controlled independently. Respective composite tape laying heads of first plurality of composite tape laying heads 116 will begin and end laying a respective composite tape based upon a design for base charge 118.

As another example, secondary charge forming station 120 has second plurality of composite tape laying heads 122. Second plurality of composite tape laying heads 122 is positioned in series to form second charge 124. Second plurality of composite tape laying heads 122 includes any desirable quantity of composite tape laying heads. In some illustrative examples, second plurality of composite tape laying heads 122 comprises between 40 and 50 tape laying heads. In some illustrative examples, second plurality of composite tape laying heads 122 comprises fewer than 40 tape laying heads. In some illustrative examples, second plurality of composite tape laying heads 122 comprises greater than 50 tape laying heads.

Second charge 124 is formed in a continuous process by second plurality of composite tape laying heads 122 laying down composite material in a simultaneous process. Each respective composite tape laying head of second plurality of composite tape laying heads 122 is controlled independently. Respective composite tape laying heads of second plurality of composite tape laying heads 122 will begin and end laying a respective composite tape based upon a design for second charge 124.

As yet another example, third charge forming station 126 has third plurality of composite tape laying heads 128. Third plurality of composite tape laying heads 128 is positioned in series to form third charge 130. Third plurality of composite tape laying heads 128 includes any desirable quantity of composite tape laying heads. In some illustrative examples, third plurality of composite tape laying heads 128 comprises between 40 and 50 tape laying heads. In some illustrative examples, third plurality of composite tape laying heads 128 comprises fewer than 40 tape laying heads. In some illustrative examples, third plurality of composite tape laying heads 128 comprises greater than 50 tape laying heads.

Third charge 130 is formed in a continuous process by third plurality of composite tape laying heads 128 laying down composite material in a simultaneous process. Each respective composite tape laying head of third plurality of composite tape laying heads 128 is controlled independently. Respective composite tape laying heads of third plurality of composite tape laying heads 128 will begin and end laying a respective composite tape based upon a design for third charge 130.

Each of base charge 118, second charge 124, and third charge 130 are components of contoured elongate composite structure 104. Each of base charge 118, second charge 124, and third charge 130 are manufactured simultaneously.

Each of base charge 118, second charge 124, and third charge 130 are formed of a respective plurality of plies of composite material. More specifically, each of base charge 118, second charge 124, and third charge 130 is a "stack" of a respective plurality of plies laid on top of each other. Each of base charge 118, second charge 124, and third charge 130 may be referred to as an elongate composite charge.

As depicted, there are three charge layup sections included in composite structure forming system 102: base charge forming station 114, secondary charge forming station 120, and third charge forming station 126. When contoured elongate composite structure 104 takes the form of a blade stringer, secondary charge forming station 120 forms a forward charge of the blade stringer: second charge 124. When contoured elongate composite structure 104 takes the form of a blade stringer, third charge forming station 126 forms an aft charge of the blade stringer: third charge 130. When contoured elongate composite structure 104 takes the form of a blade stringer, base charge forming station 114 forms base charge 118.

Each of the three sections in plurality of charge forming stations 108 operate in parallel. In some illustrative examples, each of the three sections in plurality of charge forming stations 108 operating in parallel may be referred to as each of the three sections in plurality of charge forming stations 108 operating simultaneously. When contoured elongate composite structure 104 is a blade stringer, the forward and aft charges, second charge 124 and third charge 130, are laid up as L-shaped charges.

Each conveyor belt system of plurality of conveyor systems 110 has a respective conveyor belt extending through a respective charge forming station of plurality of charge forming stations 108. As depicted, plurality of conveyor systems 110 includes base charge conveyor system 132, second charge conveyor system 134, and third charge conveyor system 136.

As an example, base charge conveyor system 132 has base charge conveyor belt 138 extending through base charge forming station 114. By traveling through base charge forming station 114, base charge conveyor belt 138 supports base charge 118 as it is laid up in base charge forming station 114.

As another example, second charge conveyor system 134 has second charge conveyor belt 140 extending through secondary charge forming station 120. By traveling through secondary charge forming station 120, second charge conveyor belt 140 supports second charge 124 as it is laid up in secondary charge forming station 120.

As yet another example, third charge conveyor system 136 has third charge conveyor belt 142 extending through third charge forming station 126. By traveling through third charge forming station 126, third charge conveyor belt 142 supports third charge 130 as it is laid up in third charge forming station 126.

Each respective conveyor system comprises a respective plurality of support rollers configured to provide support to the respective conveyor belt. For example, base charge conveyor system 132 of plurality of conveyor systems 110 comprises plurality of support rollers 144 configured to provide support to base charge conveyor belt 138. Base charge conveyor belt 138 is supported quite rigidly beneath each layup head in base charge forming station 114, to allow for some compaction pressure that is common for tape layup machines. In some illustrative examples, plurality of support rollers 144 apply the pressure without mechanically opposing the conveyance of base charge conveyor belt 138.

As another example, second charge conveyor system 134 of plurality of conveyor systems 110 comprises plurality of support rollers 146 configured to provide support to second charge conveyor belt 140. Second charge conveyor belt 140 is supported quite rigidly beneath each layup head in second charge forming station 120, to allow for some compaction pressure that is common for tape layup machines. In some illustrative examples, plurality of support rollers 146 apply the pressure without mechanically opposing the conveyance of second charge conveyor belt 140.

As another example, third charge conveyor system 136 of plurality of conveyor systems 110 comprises plurality of support rollers 148 configured to provide support to third charge conveyor belt 142. Third charge conveyor belt 142 is supported quite rigidly beneath each layup head in third charge forming station 126, to allow for some compaction pressure that is common for tape layup machines. In some illustrative examples, plurality of support rollers 148 apply the pressure without mechanically opposing the conveyance of third charge conveyor belt 142.

In some illustrative examples, each support roller of the respective plurality of support rollers is configured to move vertically along with a respective composite tape laying head. Moving a composite tape laying head and respective support roller introduces a curvature into a composite structure. A composite tape laying head and a respective support roller form a compaction nip. By moving a compaction nip vertically, a curvature is introduced into a composite charge.

For example, each support roller of plurality of support rollers 144 is configured to move vertically along with a respective composite tape laying head of first plurality of composite tape laying heads 116. As another example, each support roller of plurality of support rollers 146 is configured to move vertically along with a respective composite tape laying head of second plurality of composite tape laying heads 122. As yet another example, each support roller of plurality of support rollers 148 is configured to move vertically along with a respective composite tape laying head of third plurality of composite tape laying heads 128.

By a respective support roller and composite tape laying head moving vertically relative to a direction of movement of a respective charge, a contour is introduced into the respective charge. Each respective composite tape laying head is configured to move independently of each other composite tape laying head. Each respective support roller is configured to move independently of each other support roller. Each respective composite tape laying head and respective support roller is configured to move to introduce a contour into a composite charge according to a design.

Each composite tape laying head of the respective plurality of composite tape laying heads has a spool of composite tape. Each respective plurality of composite tape laying heads has a plurality of fiber orientations of composite tape. For example, each composite tape laying head of first plurality of composite tape laying heads 116 has a spool of composite tape. Each spool of composite tape has its own respective fiber orientation. First plurality of composite tape laying heads 116 has a plurality of fiber orientations of composite tape. The fiber orientations present and the locations of the fiber orientations within first plurality of composite tape laying heads 116 are selected based on a design for base charge 118.

In some illustrative examples, base charge 118 is formed of 5-49 plies of tape, oriented in 0°, 90°, 45°, and −45° orientations with respect to the length direction of the tape. In some illustrative examples, base charge 118 may include other orientations of composite tape such as 30°, −30°, 60°, −60°, or any other desirable orientation of composite tape. For example, composite tape may be provided in slightly off angle arrangements such as +/−1 degrees, or 2 degrees, or 3 degrees.

Each composite tape laying head of second plurality of composite tape laying heads 122 has a spool of composite tape. Each spool of composite tape has its own respective fiber orientation. Second plurality of composite tape laying heads 122 has a plurality of fiber orientations of composite tape. The fiber orientations present and the locations of the fiber orientations within second plurality of composite tape laying heads 122 are selected based on a design for second charge 124.

In some illustrative examples, second charge 124 is formed of 5-49 plies of tape, oriented in 0°, 90°, 45°, and −45° orientations with respect to the length direction of the tape. In some illustrative examples, second charge 124 may include other orientations of composite tape such as 30°, −30°, 60°, −60°, or any other desirable orientation of composite tape.

Each composite tape laying head of third plurality of composite tape laying heads 128 has a spool of composite tape. Each spool of composite tape has its own respective fiber orientation. Third plurality of composite tape laying heads 128 has a plurality of fiber orientations of composite tape. The fiber orientations present and the locations of the fiber orientations within third plurality of composite tape laying heads 128 are selected based on a design for third charge 130.

In some illustrative examples, third charge 130 is formed of 5-49 plies of tape, oriented in 0°, 90°, 45°, and −45° orientations with respect to the length direction of the tape. In some illustrative examples, third charge 130 may include other orientations of composite tape such as 30°, −30°, 60°, −60°, or any other desirable orientation of composite tape.

In some illustrative examples, contoured elongate composite structure 104 takes the form of a stringer. In some illustrative examples, contoured elongate composite structure 104 takes the form of a stringer for an aircraft wing. An individual stringer typically changes gauge from medium thickness near the root of an aircraft wing, to heavier outboard some ways from the root, to thinner near the tip of the wing. A stringer changes gauge with ply pad ups and drop offs happening down the length of the stringer. Plurality of charge layup stations 108 is configured to form ply pad ups and drops offs through the length of contoured elongate composite structure 104.

A charge layup section, such of any of plurality of charge forming stations 108, is comprised of a plurality of individual spooling heads, each located at a fixed position, each capable of laying down tape. For each of base charge forming station 114, secondary charge forming station 120, and third charge forming station 126, the first ply of tape is laid down directly on a moving belt, with subsequent plies laid atop that first ply. For example, a first ply of base charge 118 is laid up directly on base charge conveyor belt 138 using first plurality of composite tape laying heads 116 with subsequent plies laid atop the first ply.

All tape is laid down in the direction of motion of the belt as the belt advances. For example, tape in base charge forming station 114 is laid down in direction of motion of base charge conveyor belt 138 through base charge forming station 114. Tape in base charge forming station 114 is laid down in direction of length 119 of base charge 118. As another example, tape in secondary charge forming station 120 is laid down in direction of motion of second charge conveyor belt 140 in direction of motion of second charge conveyor belt 140 through secondary charge forming station 120. Tape in second charge forming station 120 is laid down in direction of length 125 of second charge 124. As another example, tape in third charge forming station 126 is laid down in direction of motion of third charge conveyor belt 142 in direction of motion of third charge conveyor belt 142 through third charge forming station 126. Tape in third charge forming station 126 is laid down in direction of length 131 of third charge 130.

Each composite tape laying head is loaded with a particular type of tape, such as tape with the fibers in the length direction of the tape (0 degree), tape with the fibers perpendicular to the length of the tape (90-degree), or fibers oriented ±45-degrees with respect to the direction of the tape. Each composite tape laying head is responsible for laying down one particular ply only and has the feed rollers and press roller to do so.

Each composite tape laying head of the respective plurality of composite tape laying heads has a respective compaction roller and a respective cutter. For example, each composite tape laying head of each of first plurality of composite tape laying heads 116, second plurality of composite tape laying heads 122, and third plurality of composite tape laying heads 128 has a respective compaction roller and a respective cutter. Each composite tape laying head is equipped with a cutter, for example a guillotine cutter, so that it can cease laying down material when its ply drops off.

Optionally, each composite tape laying head of a respective charge layup section may have a pair of splitting blades that can be used to ensure it lays down only the desired width of material. For example, each of first plurality of composite tape laying heads 116 may have a pair of splitting blades for controlling the width of material. As another example, each of second plurality of composite tape laying heads 122 may have a pair of splitting blades for controlling the width of material. As yet another example, each of third plurality of composite tape laying heads 128 may have a pair of splitting blades for controlling the width of material.

In some illustrative examples, each composite tape laying head of the respective plurality of composite tape laying heads has a respective heater. In some illustrative examples, each composite tape laying head of each of first plurality of composite tape laying heads 116, second plurality of composite tape laying heads 122, and third plurality of composite tape laying heads 128 has a respective heater. In some illustrative examples, each composite tape laying head is equipped with an IR heater to provide tack between its ply and the material onto which it is laying down.

In other illustrative examples, heaters are positioned within a charge forming station to heat regions of the charge forming station. For example, base charge forming station 114 may have heaters positioned within base charge forming station 114 to heat regions of base charge forming station 114. As another example, second charge forming station 120 may have heaters positioned within second charge forming station 120 to heat regions of second charge forming station 120. As another example, third charge forming station 126 may have heaters positioned within third charge forming station 126 to heat regions of third charge forming station 126. The type and position of heating in each of base charge forming station 114, second charge forming station 120, and third charge forming station 126 is independent of the type of heating present in the remaining charge forming stations of plurality of charge forming stations 108. Heaters may take any desirable form, including but not limited to, IR heaters, convection heaters, induction heaters, or any other desirable type of heating mechanism.

At least one of base charge 118, second charge 124, or third charge 130 has ply drop-offs or ply pad ups. Ply drop-offs or ply pad ups are used to locally control the thickness of a respective charge. In some illustrative examples, ply drop-offs occur within the charge laminate, not at the surface of the laminate. For example, a ply drop-off within base charge 118 may occur within the base charge 118 instead of at the surface of base charge 118. As another example, a ply drop-off within second charge 124 may occur within second charge 124. As yet another example, a ply drop-off within third charge 130 may occur within third charge 130 instead of at the surface of third charge 130.

When a ply drop-off or ply pad off is present, the distance between the top of the last ply and the bottom of the first ply (the top surface of the respective conveyor belt) will change during layup. Each composite tape laying head of a respective plurality of composite tape laying heads is configured to adjust its position up to 0.25" in one direction to perform ply drop-offs or ply pad ups. For example, each composite tape laying head of first plurality of composite tape laying heads 116 is configured to adjust its position up to 0.25" in a direction to perform ply drop-offs or ply pad ups. As another example, each composite tape laying head of second plurality of composite tape laying heads 122 is configured to adjust its position up to 0.25" in a direction to perform ply drop-offs or ply pad ups. As another example, each composite tape laying head of third plurality of composite tape laying heads 128 is configured to adjust its position up to 0.25" in a direction to perform ply drop-offs or ply pad ups.

Each conveyor of base charge conveyor belt 138, second charge conveyor belt 140, and third charge conveyor belt 142 is flexible to match a desired contour. A contour may also be referred to as a curvature. A desired contour may be specific to each contoured elongate composite structure, such as contoured elongate composite structure 104. For example, when contoured elongate composite structure 104 is a stringer for an aircraft wing, each conveyor of base charge conveyor belt 138, second charge conveyor belt 140, and third charge conveyor belt 142 is flexible to match a desired contour based on a desired location of contoured elongate composite structure 104 in the aircraft wing. When contoured elongate composite structure 104 is a stiffener for a hull of a ship, each conveyor of base charge conveyor belt 138, second charge conveyor belt 140, and third charge conveyor belt 142 is flexible to match a desired contour based on a desired location of contoured elongate composite structure 104 in the hull.

Moving at least one support roller of a plurality of support rollers changes the curvature of a respective conveyor belt and a charge created on the conveyor belt. Each respective composite tape laying head and respective support roller is configured to move to introduce a curvature into a composite charge according to a design.

Each conveyor belt of base charge conveyor belt 138, second charge conveyor belt 140, and third charge conveyor belt 142 is flexible to create a desired cross-sectional shape. By each conveyor of base charge conveyor belt 138, second charge conveyor belt 140, and third charge conveyor belt 142 being flexible, each of base charge conveyor belt 138, second charge conveyor belt 140, and third charge conveyor belt 142 may be used for a variety of cross-sectional shapes of composite charges. For example, a conveyor belt may be used to form a C-shaped cross-section, a right-angled cross-section, a planar cross-section, or any other desirable cross-section of composite charge.

In some illustrative examples, a conveyor belt has a desired cross-section for a charge as the composite layers of the composite charge is laid down on the conveyor belt. In one illustrative example, composite tape layers are laid down on the conveyor belt while the conveyor belt has an "L-shaped" cross-section.

In other illustrative examples, a conveyor belt is substantially flat as the charge is laid down on the conveyor belt. In these illustrative examples, the conveyor belt and the charge are gradually formed to a desired cross-section, such as a C-shaped cross-section, a L-shaped cross-section, or any other desired cross-sectional shape after all composite layers are on the conveyor belt.

The design of composite structure forming system 102 is configured to allow layup of contoured elongate composite structure 104. To match the desired contour, each roller-and-head pair of composite structure forming system 102 translates vertically as a pair throughout the layup of a respective charge. In some illustrative examples, the vertical movement is up to 2.5 feet. Each of base charge conveyor belt 138, second charge conveyor belt 140, and third charge conveyor belt 142 is flexible to provide a desirable contour in each of base charge 118, second charge 124, and third charge 130.

In some illustrative examples, when contoured elongate composite structure 104 is a blade stringer, plurality of support rollers 146 and plurality of support rollers 148 take the form of adjustable rollers. In some illustrative examples, plurality of support rollers 146 and plurality of support rollers 148 take the form of U-shaped adjustable rollers. In some illustrative examples, plurality of support rollers 146 and plurality of support rollers 148 take the form of L-shaped adjustable rollers.

In some illustrative examples, when contoured elongate composite structure 104 is a blade stringer, the L-charges, second charge 124 and third charge 130 are laid up on OML-type conveyor tooling. In these illustrative examples, the outermost ply of the respective laminate, either second charge 124 or third charge 130 is laid up first. In these illustrative examples, the ply interfacing base charge 118, composite noodle 154, and the other respective charge of second charge 124 or third charge 130 is the last ply laid.

Composite noodle extrusion system 112 may also be known as a noodle extruder or a noodle lamination machine, depending on whether a unidirectional noodle or laminated noodle is created. Composite noodle extrusion system 112 extrudes a desired shape and desired volume of noodle for a given design of contoured elongate composite structure 104.

In some illustrative examples, composite noodle extrusion system 112 is an extruding head on a mechanical arm. In some illustrative examples, composite noodle extrusion system 112 is a stationary system that extrudes a noodle onto a moving belt.

Composite structure forming system 102 further comprises structure assembly region 150. Structure assembly region 150 is where the components of contoured elongate composite structure 104 come together. Compaction roller 152 is within structure assembly region 150. Compaction roller 152 applies pressure to at least one of base charge 118, second charge 124, or third charge 130 to form contoured elongate composite structure 104. In some illustrative examples, compaction roller 152 applies pressure to the base charge 118 to form contoured elongate composite structure 104. A compaction nip is formed within structure assembly region 150 by compaction roller 152 and a number of support rollers.

At least one conveyor belt of plurality of conveyor systems 110 extends through structure assembly region 150. In some illustrative examples, second charge conveyor belt 140 and third charge conveyor belt 142 extend through structure assembly region 150. In some illustrative examples, one conveyor belt of plurality of conveyor systems 110 ends prior to structure assembly region 150. In some illustrative examples, base charge conveyor belt 138 ends prior to structure assembly region 150.

In some illustrative examples, at least one conveyor belt of plurality of conveyor systems 110 applies pressure to at least one of base charge 118, second charge 124, or third charge 130 in structure assembly region 150. In some illustrative examples, second charge conveyor belt 140 and third charge conveyor belt 142 apply pressure to second charge 124 and third charge 130 in structure assembly region 150.

When contoured elongate composite structure 104 is a blade stringer, the L-shaped forward and aft charges are fabricated on lines, secondary charge forming station 120 and third charge forming station 126, that are approximately parallel to each other. The L-shaped forward and aft charges are second charge 124 and third charge 130. In some illustrative examples, after the last layup head, one or both of these lines, secondary charge forming station 120 and third charge forming station 126, are curved slightly to make the approach of these two lines gradual.

Alignment features on the conveyor belts for the forward and aft charges, second charge conveyor belt 140 and third charge conveyor belt 142, are compared to adjust the relative positions of the two belts such that the composites, second charge 124 and third charge 130, touch together and are squeezed with some minor pressure, to form the blade. The extruded noodle, composite noodle 154, is laid in the noodle gap formed by second charge 124 and third charge 130. Base charge 118 is lowered on top of composite noodle 154, second charge 124, and third charge 130, and pressed slightly, resulting in an uncured shape of a blade stringer.

Base charge conveyor belt terminates prior to where base charge 118 contacts second charge 124 and third charge 130. A portion of the transport of base charge 118 is unsupported. In some illustrative examples, base charge 118 is unsupported for a few inches prior to contacting second charge 124 and third charge 130.

Compaction roller 152 is used to apply pressure to the "top" ply of base charge 118. When contoured elongate composite structure 104 is a stringer, the "top" ply of base charge 118 is ply of base charge 118 that will contact the wing skin. In some illustrative examples, the "top" ply of base charge 118 is the last ply laid down by base charge forming station 114.

After base charge 118, second charge 124, third charge 130, and composite noodle 154 are pressed together to form contoured elongate composite structure 104, contoured elongate composite structure 104 exits composite structure forming system 102. Second charge conveyor belt 140 and third charge conveyor belt 142 turn around as contoured elongate composite structure 104 exits composite structure forming system 102.

When contoured elongate composite structure 104 exits composite structure forming system 102, contoured elongate composite structure 104 is uncured. Contoured elongate composite structure 104 has any desirable composite layup design, any desirable length, and any desirable cross-section.

In some illustrative examples, contoured elongate composite structure 104 is a stringer. Depending on the wing design, for some aircraft wings, a stringer could be up to 100 ft long. When contoured elongate composite structure 104 is a stringer for a wing, base charge 118 is built to match the contour of the wing. In these illustrative examples, it is desirable to support contoured elongate composite structure 104 in a way that matches the contour of the wing.

Manufacturing environment 100 has contoured elongate composite structure receipt and transportation system 106 configured to support contoured elongate composite structure 104. Contoured elongate composite structure receipt and transportation system 106 comprises structural frame 156, plurality of moveable supports 157, plurality of displacement systems 160, and movement system 162. Plurality of displacement systems 160 connect plurality of moveable supports 157 to structural frame 156 and is configured to move plurality of moveable supports 157 vertically relative to structural frame 156. Movement system 162 is connected to base 164 of structural frame 156. In some illustrative examples, plurality of moveable supports 157 comprises plurality of moveable support rollers 158.

Plurality of displacement systems 160 is independently controllable. Each of plurality of displacement systems 160 is moveable to support contoured elongate composite structure 104.

Contoured elongate composite structure receipt and transportation system 106 further comprises conveyor belt 168 configured to receive contoured elongate composite structure 104. Conveyor belt 168 is configured to travel across plurality of moveable support rollers 158. Conveyor belt 168 is configured to travel across plurality of moveable support rollers 158 at a rate equal to an expulsion rate (not depicted) of contoured elongate composite structure 104 from composite structure forming system 102.

Contoured elongate composite structure receipt and transportation system 106 further comprises controller 170 configured to control plurality of displacement systems 160 independently such that plurality of moveable supports 157 provides support to a contour of contoured elongate composite structure 104. Controller 170 controls plurality of displacement systems 160 based on a design for contoured elongate composite structure 104. For example, controller 170 may control plurality of displacement systems 160 based on a CAD model for contoured elongate composite structure 104. In some illustrative examples, controller 170 controls plurality of displacement systems 160 based on results from sensors, such as proximity sensors or any other desirable type of sensors, associated with at least one of composite structure forming system 102 or contoured elongate composite structure receipt and transportation system 106.

As depicted, plurality of sensors 172 is configured to detect a position of a composite structure, such as contoured elongate composite structure 104, relative to contoured elongate composite structure receipt and transportation system 106. In some illustrative examples, controller 170 utilizes output of plurality of sensors 172 to control plurality of displacement systems 160 based on a position of the composite structure.

In some illustrative examples, contoured elongate composite structure 104 is received by contoured elongate composite structure receipt and transportation system 106 as contoured elongate composite structure receipt and transportation system 106 moves away from composite structure forming system 102 at a rate equivalent to the expulsion rate of contoured elongate composite structure 104 from composite structure forming system 102. In some of these illustrative examples, controller 170 controls plurality of displacement systems 160 to position plurality of moveable supports 157 prior to contoured elongate composite structure receipt and transportation system 106 receiving contoured elongate composite structure 104. In some of these illustrative examples, controller 170 controls plurality of displacement systems 160 to position plurality of moveable supports 157 as contoured elongate composite structure receipt and transportation system 106 is moved relative to composite structure forming system 102. In some other illustrative examples, as contoured elongate composite structure 104 moves across contoured elongate composite structure receipt and transportation system 106 plurality of moveable support rollers 158 move to support contoured elongate composite structure 104.

In some illustrative examples, contoured elongate composite structure receipt and transportation system 106 has more than one conveyor belt. For example, when contoured elongate composite structure 104 takes the form of a blade stringer, a respective conveyor belt may support each of second charge 124 and third charge 130 on contoured elongate composite structure receipt and transportation system 106. In some illustrative examples, contoured elongate composite structure receipt and transportation system 106 may be described as an adjustable split conveyor belt tool.

In some illustrative examples, contoured elongate composite structure 104 is a blade stringer and composite structure forming system 102 expels blade stringers in a blade-down configuration. In these illustrative examples, contoured elongate composite structure receipt and transportation system 106 is designed to support the weight of a blade stringer by its flanges, with a slit or gap to allow the blade room to hang. In these illustrative examples, contoured elongate composite structure receipt and transportation system 106 tool does not press against the blade.

Conveyor belt 168 and any other conveyor belts of contoured elongate composite structure receipt and transportation system 106 are supported by plurality of moveable support rollers 158 that are at adjustable heights. As more of contoured elongate composite structure 104 is expelled from composite structure forming system 102, the height of each roller of plurality of moveable support rollers 158 is computer-adjusted by controller 170 so that contoured elongate composite structure 104 is held in its correctly-contoured configuration as it is expelled.

Contoured elongate composite structure receipt and transportation system 106 is parked, fixed with respect to composite structure forming system 102, so long as composite structure forming system 102 is producing a given composite structure, such as contoured elongate composite structure 104. Once the composite structure, such as contoured elongate composite structure 104, is complete, conveyor belt 168 of contoured elongate composite structure receipt and transportation system 106 stops rolling, the contoured elongate composite structure 104 remains fixed on contoured elongate composite structure receipt and transportation system 106, and contoured elongate composite structure receipt and transportation system 106 is wheeled out to a desired location for contoured elongate composite structure 104, such as for transfer to a cure tool.

In some illustrative examples, another contoured elongate composite structure receipt and transportation system is moved within manufacturing environment relative to composite structure forming system 102 to receive another contoured elongate composite structure expelled from composite structure forming system 102. In some illustrative examples, at least two contoured elongate composite structure receipt and transportation systems are present within manufacturing environment 100 to operate with a high duty cycle.

One single CCSM can produce all of the stringers required for any number of programs or can be easily reconfigured to a different model of airplane, as production rates for one model decreases and production rates for another increase.

The illustration of manufacturing environment 100 in FIG. 1 is not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

For example, although composite structure forming system 102 is depicted forming three composite charges: base charge 118, second charge 124, and third charge 130, in some illustrative examples, contoured elongate composite structure 104 may include only two charges. Further, although composite structure forming system 102 is shown with composite noodle 154, in some illustrative examples, composite noodle 154 is optional.

As another example, after being expelled from composite structure forming system 102, contoured elongate composite structure 104 may be fed through a cutting station prior to exiting composite structure forming system 102. A cutting station may customize the size of contoured elongate composite structure 104 regardless of the width of composite tape provided by each of the pluralities of composite tape laying heads.

In some illustrative examples, a respective cutting station may be associated with at least one of base charge forming station 114, secondary charge forming station 120, or third charge forming station 126. A cutting station may customize the size of at least one of base charge 118, second charge 124, or third charge 130 regardless of the width of composite tape provided by the respective plurality of composite tape laying heads.

As a further example, although composite structure forming system 102 is depicted as having three charge forming stations, composite structure forming system 102 may have any desirable quantity of charge forming stations. For example, composite structure forming system 102 may have two charge forming stations. In other illustrative examples, composite structure forming system 102 may have four or more charge forming stations.

As another example, contoured elongate composite structure 104 may have any desirable shape. For example, composite structure 104 may have an I, J, T, Z or any other desirably shaped cross-section. Any desirable quantity of composite charges and any desirable quantity of composite noodles may be used to form the desired cross-section for composite structure 104.

In one illustrative example, composite structure 104 may have an I-shaped cross-section. In this illustrative examples, composite structure 104 may include four composite charges and two composite noodles. In this illustrative examples, composite structure forming system 102 has four charge forming stations and two composite noodle extrusion systems.

In another illustrative example, contoured elongate composite structure receipt and transportation system 106 further comprises a plurality of sensors configured to detect a position of a composite structure, such as contoured elongate composite structure 104, relative to contoured elongate composite structure receipt and transportation system 106. In these illustrative examples, controller 170 utilizes output of the plurality of sensors to control plurality of displacement systems 160 based on a position of the composite structure.

In yet another illustrative example, composite structure forming system 102 expels contoured elongate composite structure 104 onto a different system or product. For example, composite structure forming system 102 expels contoured elongate composite structure 104 onto a product, such as a composite skin. As another example, composite structure forming system 102 expels contoured elongate composite structure 104 onto a mold or other tooling.

Figure 2:
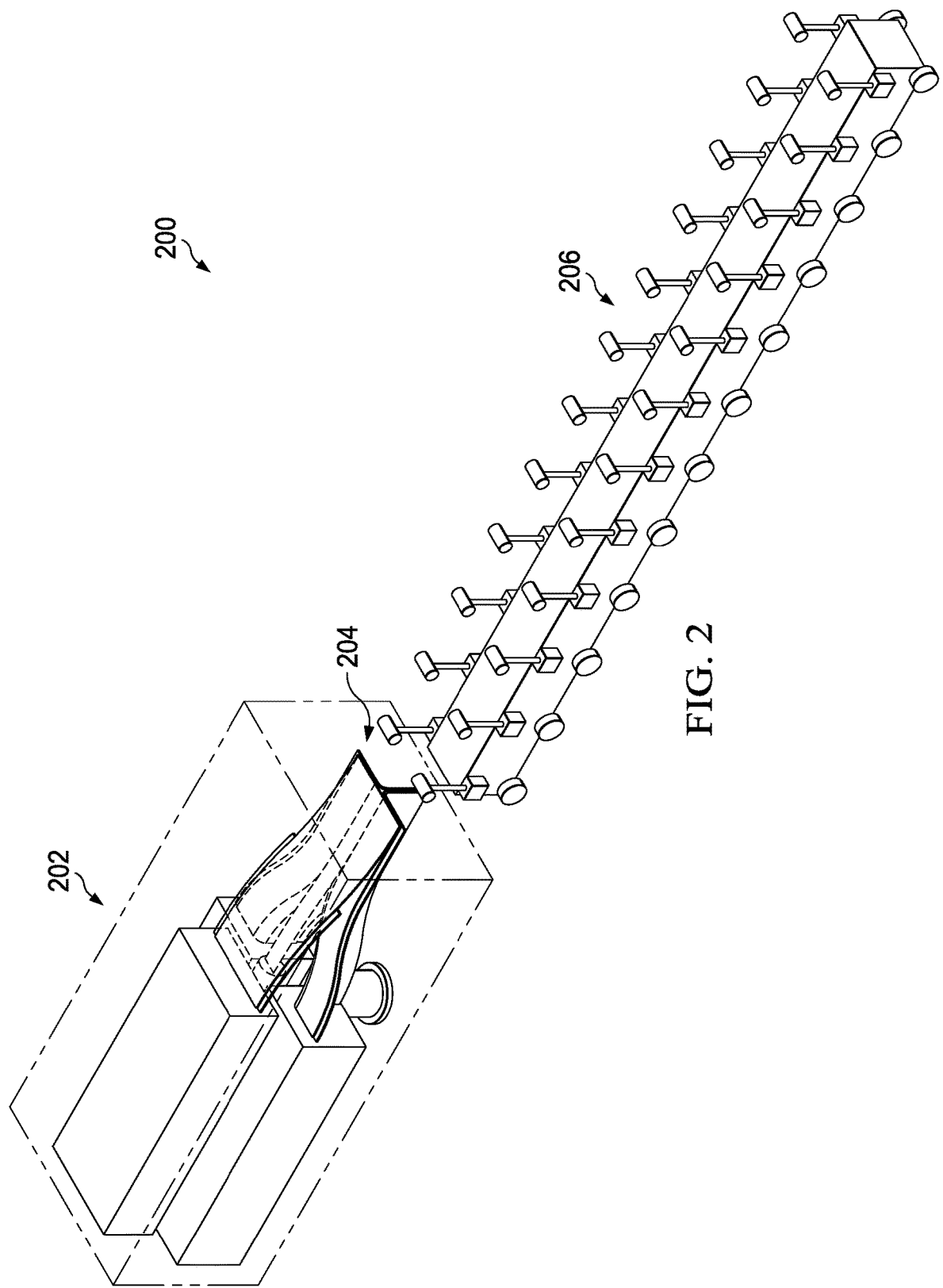
FIG. 2 is an illustration of a manufacturing environment in which a contoured elongate composite structure is manufactured in accordance with an illustrative example.

Turning now to FIG. 2, an illustration of a manufacturing environment in which a contoured elongate composite structure is manufactured is depicted in accordance with an illustrative example. Manufacturing environment 200 is a physical implementation of manufacturing environment 100 of FIG. 1.

Manufacturing environment 200 includes composite structure forming system 202 configured to form contoured elongate composite structure 204 and contoured elongate composite structure receipt and transportation system 206. Composite structure forming system 202 is an implementation of composite structure forming system 102 of FIG. 1. Composite structure forming system 202 forms contoured elongate composite structure 204 in a continuous process. Composite structure forming system 202 lays up contoured elongate composite structure 204 with the contour. Composite structure forming system 202 forms a desired contour into each constituent part of contoured elongate composite structure 204.

After exiting composite structure forming system 202, contoured elongate composite structure 204 is received by contoured elongate composite structure receipt and transportation system 206. Contoured elongate composite structure receipt and transportation system 206 is an implementation of contoured elongate composite structure receipt and transportation system 106 of FIG. 1. Contoured elongate composite structure 204 travels over contoured elongate composite structure receipt and transportation system 206 until contoured elongate composite structure 204 is complete.

Contoured elongate composite structure receipt and transportation system 206 is configured to support the contour of contoured elongate composite structure 204. As contoured elongate composite structure 204 travels over contoured elongate composite structure receipt and transportation system 206, contoured elongate composite structure receipt and transportation system 206 is adjusted to support the contour of contoured elongate composite structure 204.

After contoured elongate composite structure 204 is complete, contoured elongate composite structure 204 rests on contoured elongate composite structure receipt and transportation system 206. After contoured elongate composite structure 204 is complete, contoured elongate composite structure receipt and transportation system 206 moves away from composite structure forming system 202.

After contoured elongate composite structure receipt and transportation system 206 moves away from composite structure forming system 202, another contoured elongate composite structure receipt and transportation system may be moved into position to receive another contoured elongate composite structure. In some illustrative examples, prior to forming future contoured elongate composite structures, composite structure forming system 202 is adjusted.

Composite structure forming system 202 may be adjusted by changing the quantity of composite tape laying heads ready to lay down composite tape. Composite structure forming system 202 may be adjusted by changing fiber orientation of composite tape in composite structure forming system 202. Composite structure forming system 202 may be adjusted by changing a quantity of charge forming stations to be used. Composite structure forming system 202 may be adjusted by adjusting relative locations of charge forming stations within composite structure forming system 202. Composite structure forming system 202 may be adjusted by changing the types of conveyor belts within composite structure forming system 202.

Figure 3:
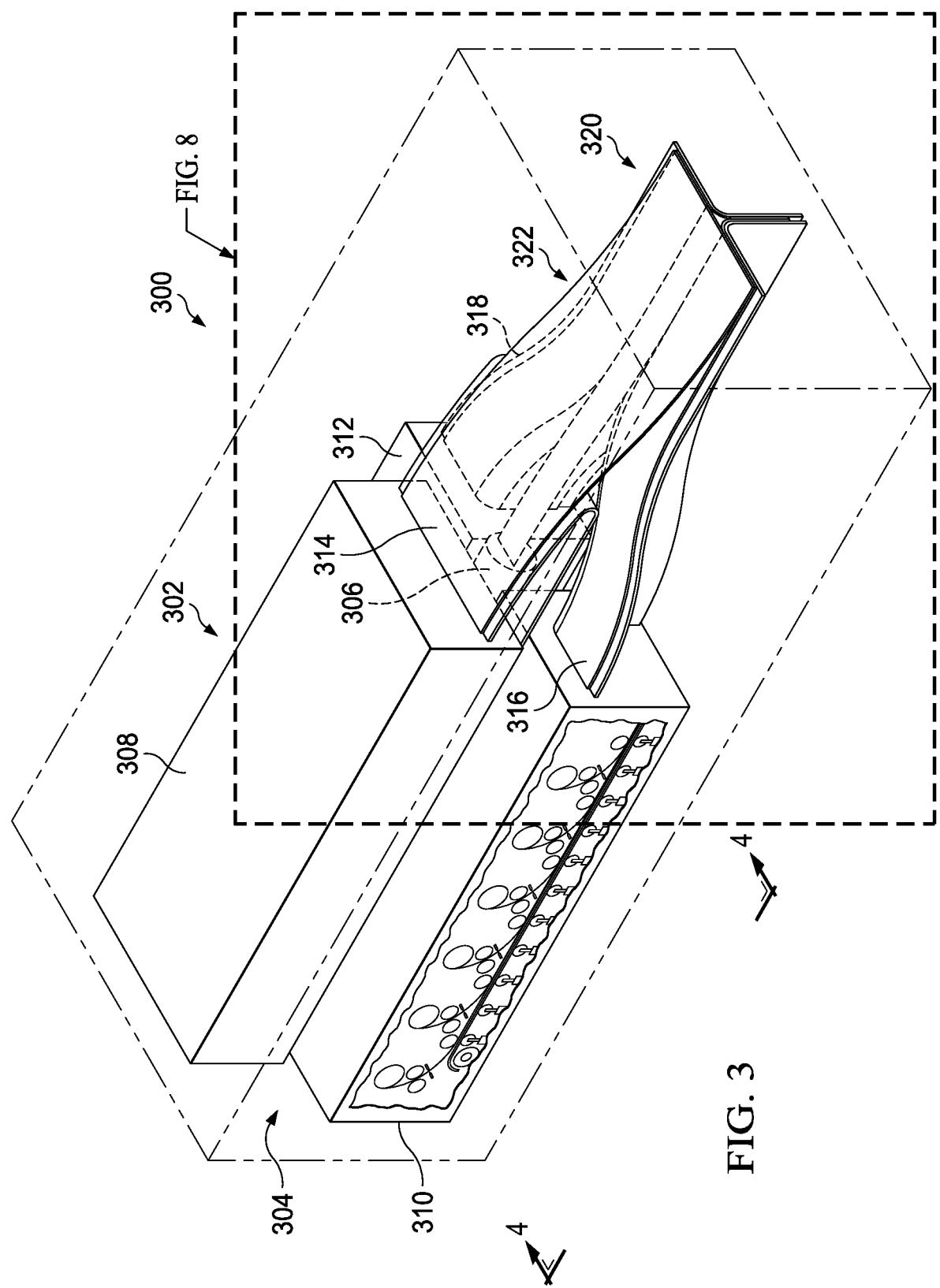
FIG. 3 is an illustration of a composite structure forming system in which a contoured elongate composite structure is manufactured in accordance with an illustrative example.

Turning now to FIG. 3, an illustration of a composite structure forming system in which a contoured elongate composite structure is manufactured is depicted in accordance with an illustrative example. Composite structure forming system 300 is a physical implementation of composite structure forming system 102 of FIG. 1. In some illustrative examples, composite structure forming system 300 is the same as composite structure forming system 202 of FIG. 2. Composite structure forming system 300 is a simplistic non-limiting illustration of an example of a composite structure forming system.

Composite structure forming system 300 comprises plurality of charge forming stations 302, plurality of conveyor systems 304, and composite noodle extrusion system 306. Plurality of charge forming stations 302 is an implementation of plurality of charge forming stations 108 of FIG. 1. As depicted, plurality of charge forming stations 302 comprises base charge forming station 308, secondary charge forming station 310, and third charge forming station 312.

Plurality of conveyor systems 304 is an implementation of plurality of conveyor systems 110 of FIG. 1. Plurality of conveyor systems 304 comprises base charge conveyor system 314, second charge conveyor system 316, and third charge conveyor system 318. Each conveyor belt system of plurality of conveyor systems 304 has a respective conveyor belt extending through a respective charge forming station of plurality of charge forming stations 302. For example, a base charge conveyor belt of base charge conveyor system 314 extends through base charge forming station 308. As another example, a second charge conveyor belt of second charge conveyor system 316 extends through second charge forming station 310.

As depicted in FIG. 3, each pair of plurality of conveyor systems 304 and plurality of charge forming systems is represented by a rectangular box or housing. Motors or other desirable mechanisms for a respective conveyor belt may be present within a respective rectangular box of FIG. 3. Additionally, each charge conveyor system of plurality of conveyor systems further comprises a respective plurality of support rollers within a respective one of the rectangular boxes also containing one of base charge forming station 308, secondary charge forming station 310, or third charge forming station 312. Each charge conveyor system of plurality of conveyor systems further comprises a respective conveyor belt that extends through a respective charge forming station of plurality of charge forming stations 302.

A respective charge is laid up on each respective conveyor belt. A respective charge is laid up on a respective conveyor belt as the respective conveyor belt extends through a respective charge forming station. For example, a base charge is laid up by a plurality of composite tape laying heads of base charge forming station 308 on a base charge conveyor belt as the base charge conveyor belt travels through the base charge forming station 308. As another example, a second charge is laid up by a plurality of composite tape laying heads of second charge forming station 310 on a second charge conveyor belt as the second charge conveyor belt travels through the second charge forming station 310. As yet another example, a third charge is laid up by a plurality of composite tape laying heads of third charge forming station 312 on a third charge conveyor belt as the third charge conveyor belt travels through the third charge forming station 312.

Each respective conveyor system comprises a respective plurality of support rollers configured to provide support to the respective conveyor belt. For example, base charge conveyor system 314 comprises a plurality of support rollers configured to provide support to a base charge conveyor belt. In some illustrative examples, the plurality of support rollers of base charge conveyor system 314 are present within base charge forming station 308.

As another example, second charge conveyor system 316 comprises a plurality of support rollers configured to provide support to a second charge conveyor belt. In some illustrative examples, the plurality of support rollers of second charge conveyor system 316 are present within second charge forming station 310. As yet another example, third charge conveyor system 318 comprises a plurality of support rollers configured to provide support to a base charge conveyor belt. In some illustrative examples, the plurality of support rollers of third charge conveyor system 318 are present within third charge forming station 312.

Each respective charge conveyor belt is supported quite rigidly beneath each layup head in a respective charge forming station, to allow for some compaction pressure supplied by one of the tape layup machines. Each respective charge conveyor belt is supported to allow for the compaction pressure during application of the tows with a compaction roller of a respective layup head. For example, a base charge conveyor belt is supported quite rigidly by a plurality of support rollers of base charge conveyor system 314 configured to provide support beneath each layup head of base charge forming station 308. Application pressure of the roller nip (not depicted) of a layup head is reacted by a support roller. As another example, a second charge conveyor belt is supported quite rigidly by a plurality of support rollers of second charge conveyor system 316 configured to provide support beneath each layup head of second charge forming station 310. As yet another example, a third charge conveyor belt is supported quite rigidly by a plurality of support rollers of third charge conveyor system 318 configured to provide support beneath each layup head of third charge forming station 312. Each plurality of support rollers applies pressure without mechanically opposing the conveyance of a respective charge conveyor belt.

All tape in a respective charge forming station is laid down in the direction of motion of a respective conveyor belt. For example, tape in base charge forming station 308 is laid down in direction of motion of a base charge conveyor belt through base charge forming station 308. As another example, tape in second charge forming station 310 is laid down in direction of motion of a second charge conveyor belt through second charge forming station 310. As yet another example, tape in third charge forming station 312 is laid down in direction of motion of a third charge conveyor belt through third charge forming station 312.

Each respective conveyor belt moves towards structure assembly region 320 of composite structure forming system 300. At least one conveyor belt of base charge conveyor system 314, second charge conveyor system 316, or third charge conveyor system 318 does not extend through structure assembly region 320. Structure assembly region 320 of composite structure forming system 300 forms a contoured elongate composite structure from plurality of composite charges 322.

Figure 4:
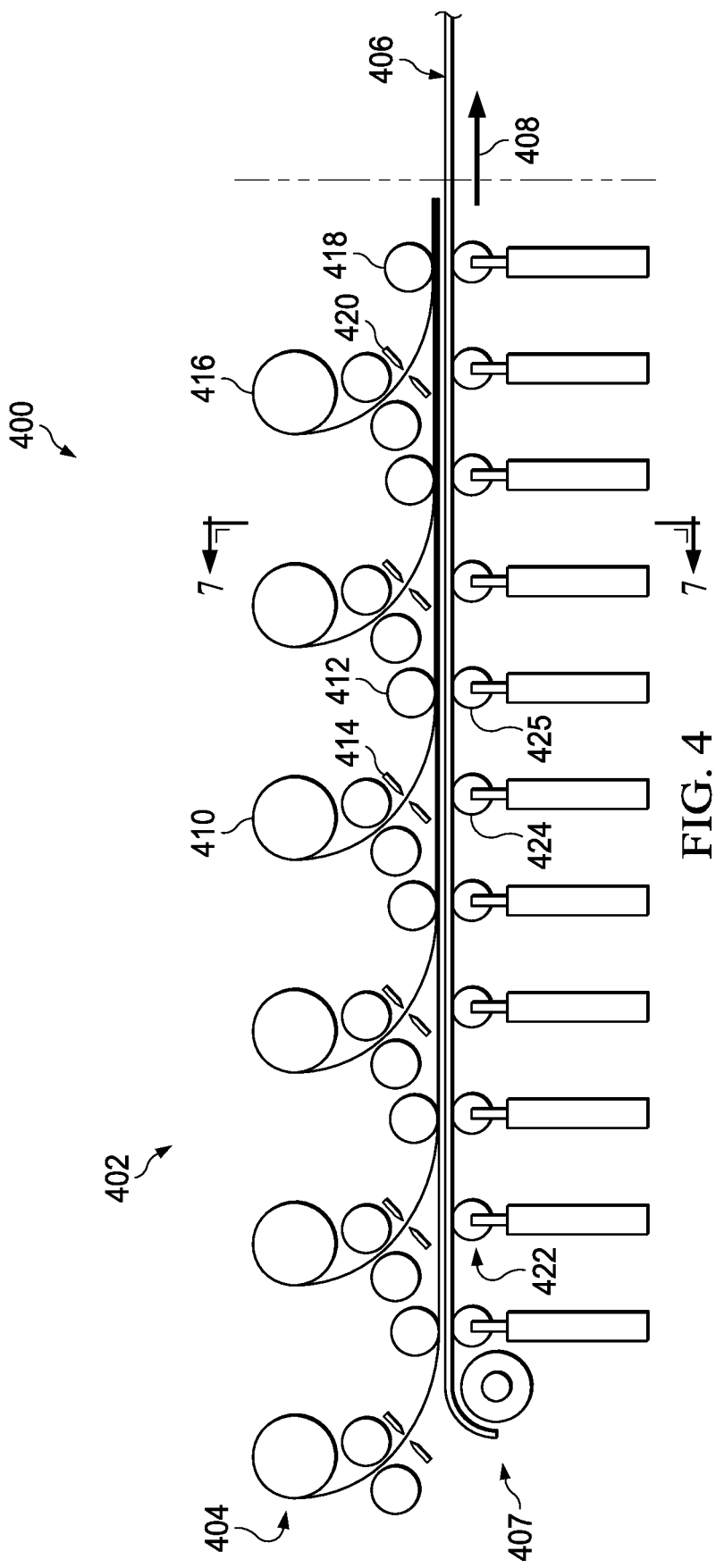
FIG. 4 is an illustration of a side view of a charge forming station of a composite structure forming system in accordance with an illustrative example.

Turning now to FIG. 4, an illustration of a side view of a charge forming station of a composite structure forming system is depicted in accordance with an illustrative example. View 400 is a simplistic side view of a portion of a charge forming station, such as one of base charge forming station 114, secondary charge forming station 120, or third charge forming station 126 of FIG. 1. In some illustrative examples, charge forming station 402 is part of composite structure forming system 202. In some illustrative examples, charge forming station 402 is part of composite structure forming system 300 of FIG. 3. View 400 is a non-limiting view provided for explanative purposes.

In some illustrative examples, charge forming station 402 is one of a plurality of charge forming stations. For example, charge forming station 402 may be one of base charge forming station 308, secondary charge forming station 310, or third charge forming station 312 of FIG. 3.

Charge forming station 402 comprises plurality of composite tape laying heads 404 in series. Each of plurality of composite tape laying heads 404 is located in a fixed position in the series.

Conveyor belt 406 extends through charge forming station 402. As depicted, conveyor belt 406 travels beneath plurality of composite tape laying heads 404 of charge forming station 402.

Conveyor belt 406 is part of conveyor system 407 configured to support and transport conveyor belt 406 through charge forming station 402. When charge forming station 402 is one of a plurality of charge forming stations, conveyor system 407 is one of a plurality of conveyor systems associated with the plurality of charge forming stations.

Conveyor belt 406 moves in direction 408 through charge forming station 402. Conveyor belt 406 carries tape laid down by plurality of composite tape laying heads 404 through charge forming station 402.

The first ply of tape is laid down directly on conveyor belt 406, with subsequent plies laid atop that first ply. All tape is laid down in direction 408 of motion of conveyor belt 406.

Each composite tape laying head of plurality of composite tape laying heads 404 has a respective compaction roller and a respective cutter. For example, composite tape laying head 410 has compaction roller 412 and cutter 414. As depicted, composite tape laying head 416 has compaction roller 418 and cutter 420. Each composite tape laying head is equipped with a cutter, so that each composite tape laying head can cease laying down material when its ply drops off.

In some illustrative examples, each composite tape laying head of plurality of composite tape laying heads 404 has a respective heater. In some illustrative examples, each composite tape laying head of plurality of composite tape laying heads 404 is equipped with an IR heater to provide tack between its ply and the material onto which it is laying down. In other illustrative examples, heaters are positioned within charge forming station 402 to heat regions of charge forming station 402.

Each composite tape laying head of plurality of composite tape laying heads 404 has a spool of composite tape. Each spool of composite tape has its own respective fiber orientation. The fiber orientations present and the locations of the fiber orientations within plurality of composite tape laying heads 404 are selected based on a design for a charge to be formed by charge forming station 402. In some illustrative examples, a charge is formed of between 5 and 49 plies of tape, oriented in 0°, 90°, 45°, and −45° orientations with respect to the length direction of the tape.

Plurality of composite tape laying heads 404 has a quantity of composite tape laying heads sufficient to lay down a charge. As depicted, plurality of composite tape laying heads 404 includes at least six composite tape laying heads. In some illustrative examples, additional composite tape laying heads of plurality of composite tape laying heads 404 are present to the right of the cut view of FIG. 4. Plurality of composite tape laying heads 404 comprises composite tape laying head 410 and composite tape laying head 416. The quantity of composite tape laying heads is sufficient so that plurality of composite tape laying heads 404 is adjustable to create any desirable layup for a charge.

Conveyor system 407 comprises plurality of support rollers 422 configured to provide support to conveyor belt 406. Conveyor belt 406 is supported quite rigidly beneath each layup head of plurality of composite tape laying heads 404 to allow for some compaction pressure that is common for tape layup machines. In some illustrative examples, plurality of support rollers 422 apply the pressure without mechanically opposing the conveyance of conveyor belt 406.

As depicted, the compaction rollers for each layup head of plurality of composite tape laying heads 404 are stationed above plurality of support rollers 422. Tape is applied by plurality of composite tape laying heads 404 at the same rate as the 408 advancement rate of conveyor belt 406. Therefore, the plurality of composite tape laying heads 404 remain stationary with respect to direction 408 during the application process and the composite tape is dispensed at the same rate as the advancement speed of conveyor belt 406.

In some illustrative examples, each support roller of plurality of support rollers 422 is configured to move vertically along with a respective composite tape laying head of plurality of composite tape laying heads 404. For example, support roller 424 and support roller 425 are configured to move vertically along with composite tape laying head 410 having compaction roller 412. As another example, support roller 426 is configured to move vertically along with composite tape laying head 416.

Each compaction roller, such as compaction roller 412 is configured to form a compaction nip with a corresponding support roller, such as support roller 425.

Moving at least one support roller of plurality of support rollers 422 changes the curvature of a charge created by charge forming station 402. Each respective composite tape laying head and respective support roller is configured to move to introduce a curvature into a composite charge according to a design.

In some illustrative examples, plurality of support rollers 422 take the form of adjustable rollers. In some illustrative examples, plurality of support rollers 422 take the form of U-shaped adjustable rollers. In some illustrative examples, plurality of support rollers 422 take the form of L-shaped adjustable rollers.

When plurality of support rollers 422 takes the form of adjustable rollers, adjusting the shape of plurality of support rollers 422 adjusts the resulting cross-sectional shape of the resulting charge. When plurality of support rollers 422 are adjusted, the angle of support rollers is adjusted while the axis of rotation of each of plurality of support rollers 422 remains perpendicular to the direction of movement of the conveyor belt. For example, the angle formed by plurality of support rollers 422 may be adjusted between 0 degrees and 90 degrees. When the angle formed by plurality of support rollers 422 is at 0 degrees, the support rollers are substantially parallel and form a composite charge with a substantially planar cross-section. When the angle formed by plurality of support rollers 422 is at 90 degrees, the support rollers support a composite charge with a 90 degree angle in the cross-sectional shape.

In some illustrative examples, each composite head of plurality of composite tape laying heads 404 has one or more compaction rollers that may be adjusted. In some illustrative examples, each composite head of plurality of composite tape laying heads 400 has compaction rollers that are adjustable within the same range of angles as plurality of support rollers 422.

The flexibility of conveyor belt 406 enables conveyor belt 406 to change cross-sectional shape. For example, the flexibility of conveyor belt 406 enables conveyor belt 406 to move between a substantially flat state and a cross-sectional shape with a curve or an angle.

Charge forming station 402 is configurable for a desired shape of a resulting composite charge. A quantity of composite tape laying heads of charge forming station 402 laying down tape is adjustable while laying down a composite charge. The quantity of composite tape laying heads laying down tape affects the thickness of the composite charge. The shape of plurality of support rollers 422 is adjustable to modify a cross-sectional shape of the composite charge. The vertical positions of plurality of composite tape laying heads 404 and associated support rollers affects the contour of the resulting composite charge. Changing the vertical position of at least one composite tape laying head of plurality of composite tape laying heads 404 changes the contour of the resulting composite charge. In FIG. 4, plurality of composite tape laying heads 404 are at the same height so that the composite charge is being laid up flat.

Figure 5:
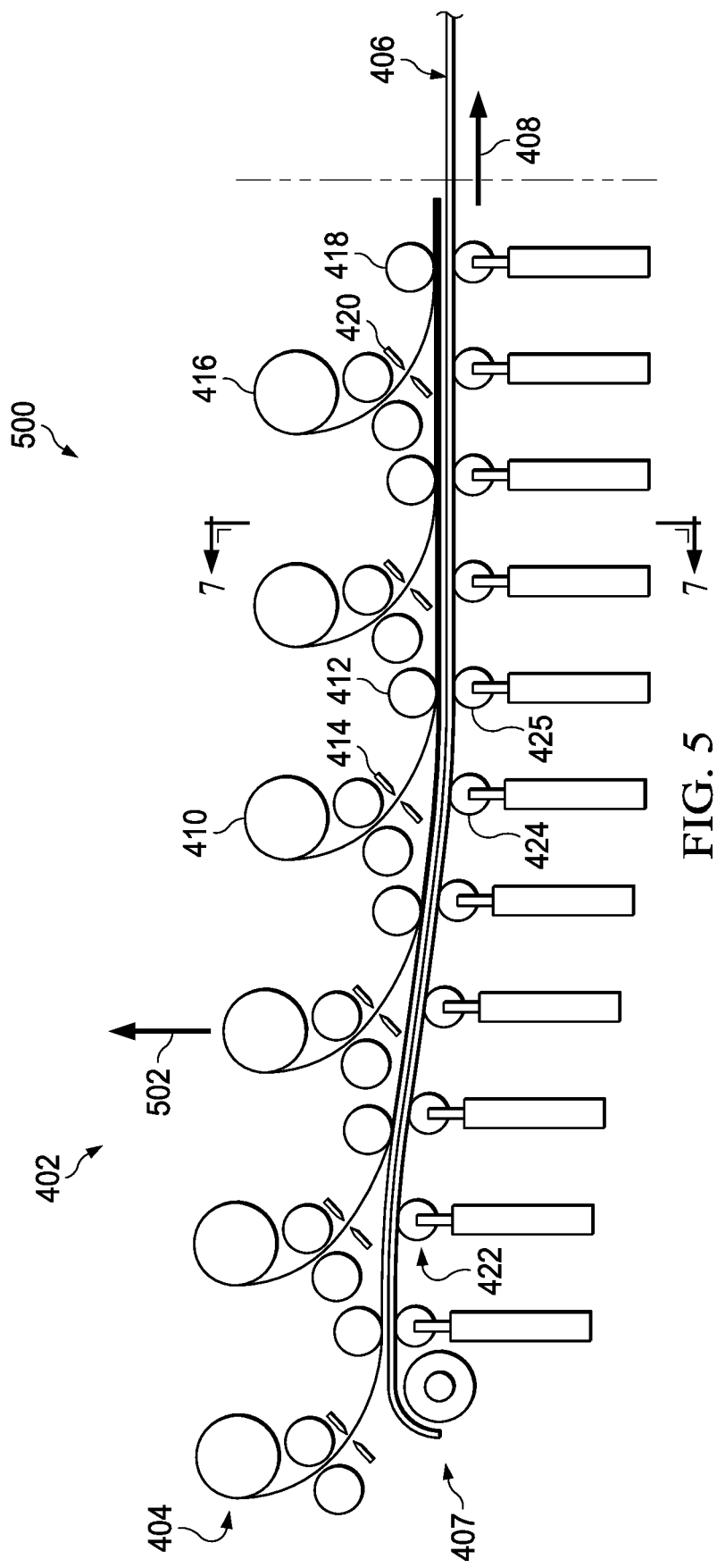
FIG. 5 is an illustration of a side view of a charge forming station of a composite structure forming system in accordance with an illustrative example.

Turning now to FIG. 5, an illustration of a side view of a charge forming station of a composite structure forming system is depicted in accordance with an illustrative example. View 500 is a view of charge forming station 402 with a modified curvature. Between FIG. 4 and FIG. 5, some of plurality of composite tape laying heads 404 have been adjusted to introduce a contour into a composite charge. When the resulting composite charge is part of an aircraft part, the contour may be described as a spanwise contour. Each respective composite tape laying head and respective support roller is configured to move to introduce a contour into a composite charge according to a design. View 500 is a non-limiting view provided for explanative purposes.

In view 500, composite tape laying head 410 has moved vertically relative to view 400. Support roller 424 and support roller 425 have been moved vertically to provide support to composite tape laying head 410. By adjusting vertical position 502 of composite tape laying head 410, contour 504 of conveyor belt 406 is changed. By adjusting vertical position 502 of composite tape laying head 410, a contour (not depicted) of a resulting contoured elongate composite structure (not depicted) is changed. By controlling the respective vertical positions of plurality of composite tape laying heads 404, the contour (not depicted) of the resulting contoured elongate composite structure formed using charge forming station 402 is controlled.

View 500 is a snapshot of laying up a composite charge in charge forming station 402. As the charge progresses in direction 408, each of plurality of composite tape laying heads 404 move vertically to accommodate the curvature of the composite charge. For example, as the charge moves in direction 408, the next subsequent composite tape laying head in direction 408 from composite tape laying head 410 will move upwards to accommodate the curvature. Plurality of composite tape laying heads 404 will move vertically throughout the layup process according to a design for the composite charge to accommodate the curvature of the composite charge.

Plurality of composite tape laying heads 404 will move up and down as the composite is laid down so that the curvature is built in to the composite charge. Plurality of composite tape laying heads 404 will move sequentially as the curvature moves down the conveyor belt 406 in direction 408. For example, a first head will move up and then a second head, a third head, a fourth head, etc. as the curvature moves through the length of conveyor belt 406.

Figure 6:
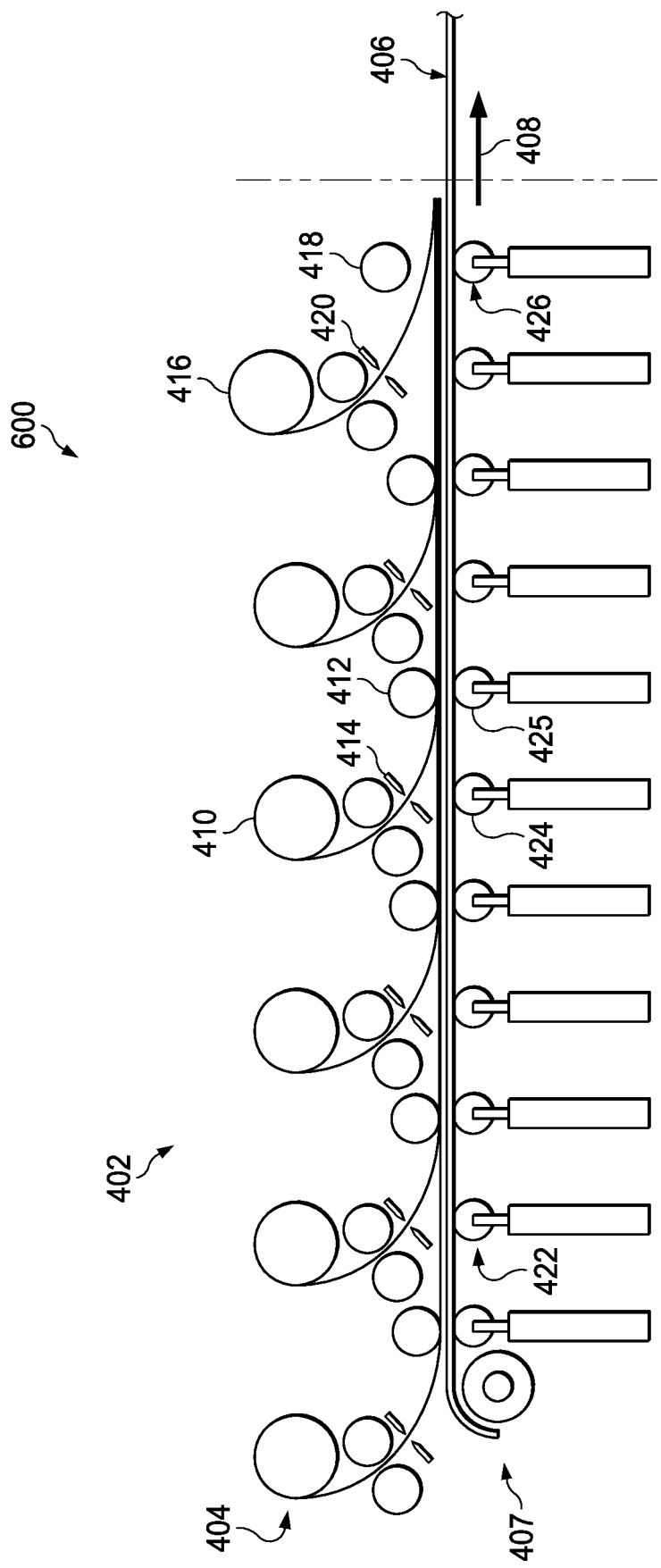
FIG. 6 is an illustration of a side view of a charge forming station of a composite structure forming system in accordance with an illustrative example.

Turning now to FIG. 6, an illustration of a side view of a charge forming station of a composite structure forming system is depicted in accordance with an illustrative example. View 600 is a view of charge forming station 402. In view 600, not all of the composite tape laying heads are laying tape. View 600 is a non-limiting view provided for explanative purposes.

In view 600, composite tape laying head 416 is not laying down tape. When a composite tape laying head of plurality of composite tape laying heads 404 isn't laying tape, the respective composite tape laying head is moved to a non-application location.

The quantity of composite tape laying heads laying composite tape affects the thickness of the resulting contoured composite charge. For example, fifteen composite tape laying heads laying composite tape lays up a section of a composite charge with fifteen composite plies. When twenty four composite tape laying heads are laying composite tape, the laid-up section of the composite charge has twenty four composite plies. As the quantity of composite tape laying heads laying tape increases, the thickness of the contoured composite charge also increases.

In some illustrative examples, at least one composite tape laying head of plurality of composite tape laying heads 404 does not lay down tape while forming a contoured composite charge. In some illustrative examples, at least one composite tape laying head lays down tape for a portion of a resulting contoured composite charge. Pad ups and drop offs are introduced into a contoured composite charge by stopping and starting laying down composite tape by respective composite tape laying heads.

Figure 7:
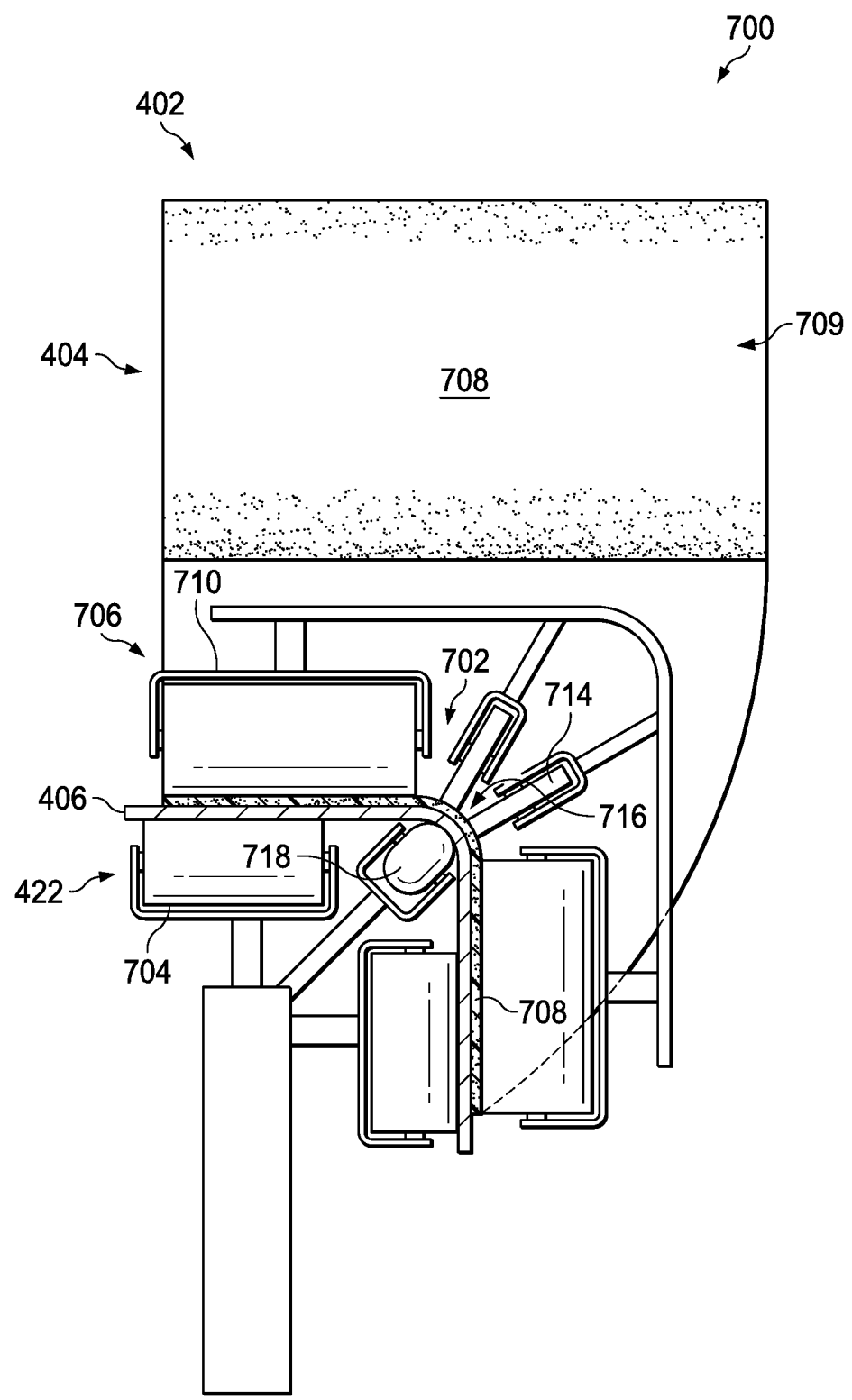
FIG. 7 is an illustration of a front view of a charge forming station of a composite structure forming system in accordance with an illustrative example.

Turning now to FIG. 7, an illustration of a front view of a charge forming station of a composite structure forming system is depicted in accordance with an illustrative example. View 700 is a front view of charge forming station 402. Charge forming station 402 may be a physical implementation of one of base charge forming station 114, secondary charge forming station 120, or third charge forming station 126 of FIG. 1.

In view 700 charge forming station 402 is configured to lay up a L-shaped charge. Charge forming station 402 has plurality of composite tape laying heads 404 that are configured to lay down composite tape in a L-shape. As depicted, each of plurality of composite tape laying heads 404 has a respective compaction roller to apply pressure to composite tape in a L-shape.

Conveyor belt 406 is supported in L-shape 702 by plurality of support rollers 422. In view 700, plurality of support rollers 422 takes the form of adjustable rollers 704. Positions of adjustable rollers 704 are adjusted to provide a desirable shape to conveyor belt 406.

In other non-depicted examples, adjustable rollers 704 may be adjusted to support conveyor belt 406 in a planar configuration. In other non-depicted examples, plurality of support rollers 422 may have additional joints to provide a U-shape.

In view 700, each composite tape layer is laid up in the cross-sectional L-shape. When each composite tape layer is laid up in the L-shape, conveyor belt 406 is supported in the cross-sectional L-shape while each composite tape layer is applied.

In view 700, composite tape laying head 706 of plurality of composite tape laying heads 404 is visible. Composite tape laying head 706 applies composite tape 708 to conveyor belt 406. In view 700, composite tape 708 is supplied in a substantially planar cross-section 709. Composite tape 708 is bent from planar cross-section 709 to L-shape 702 and then applied by compaction rollers 710 to conveyor belt 406. As depicted, adjustable rollers 704 support conveyor belt 406 as composite tape 708 is applied to conveyor belt 406.

In view 700, compaction rollers 710 of composite tape laying head 706 include rollers 714 at radius 716 of L-shape 702. In view 700, adjustable rollers 704 includes spherical roller 718 supporting radius 716 of L-shape 702.

The size, shape, layout, and quantity of compaction rollers 710 and adjustable rollers 704 shown in view 700 are non-limiting illustrative examples. In some illustrative examples, rollers 714 and rounded roller 718 are optional. In some illustrative examples, orientations of compaction rollers 710 are adjustable relative to each other. In some illustrative examples, adjustable rollers 704 are adjustable relative to each other.

In other non-depicted illustrative examples, each composite tape layer is laid up on conveyor belt 406 while conveyor belt 406 is substantially flat. In these illustrative examples, after each composite tape layer has been applied, the cross-sectional shape of conveyor belt 406 is changed before conveyor belt 406 reaches a structure assembly region (not depicted). In some illustrative examples, after each composite tape layer is laid up on conveyor belt 406, conveyor belt 406 is gradually changed to an L-shape.

Figure 13:
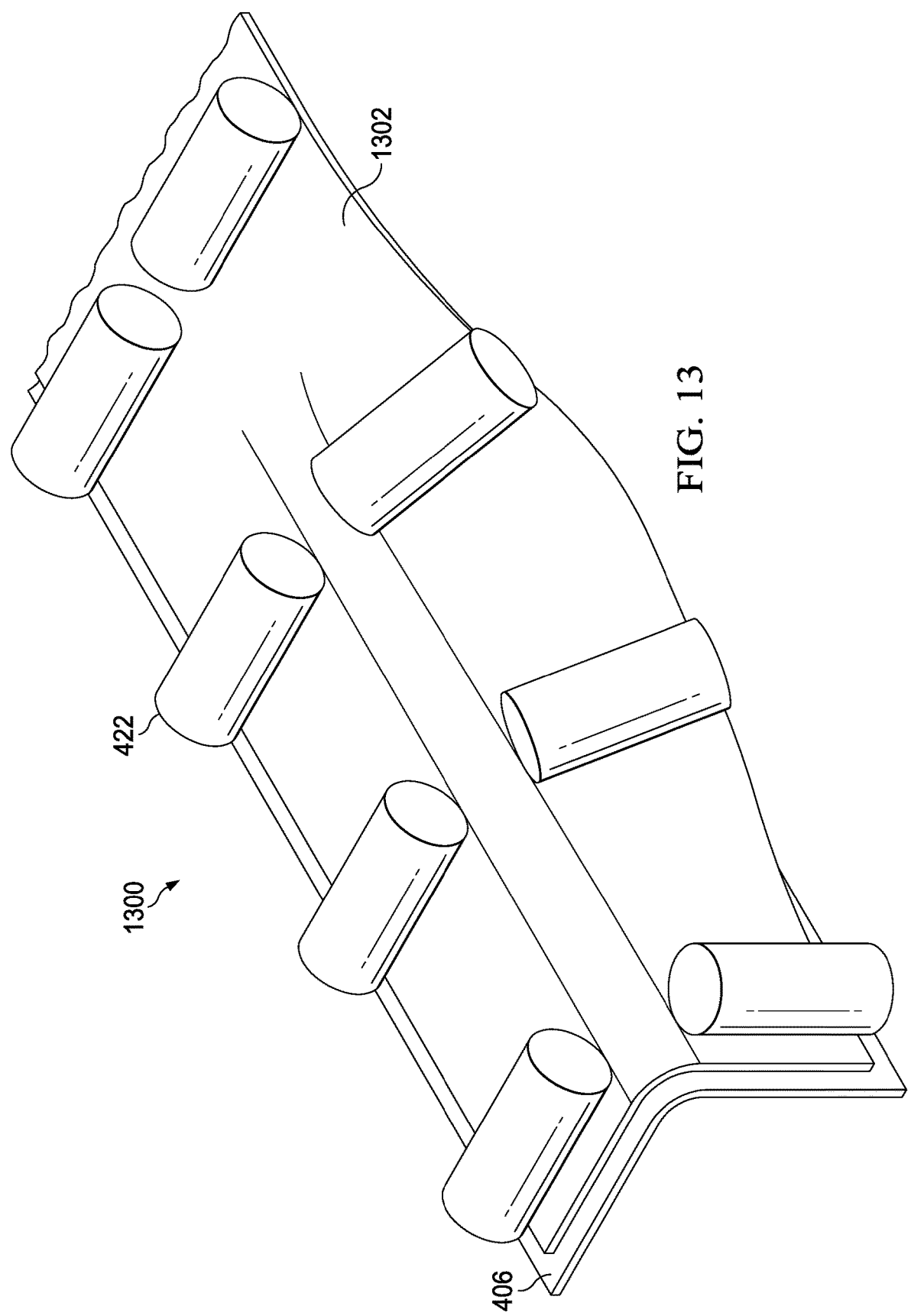
FIG. 13 is an illustration of a perspective view of a composite charge as its cross-section is modified in accordance with an illustrative example.

In these illustrative examples, past the last composite tape laying head of plurality of composite tape laying heads 404, the shape of plurality of support rollers 422 gradually changes. In these illustrative examples, plurality of support rollers 422 comprises pairs of collinear rollers. In these illustrative examples, as conveyor belt 406 approaches a structure assembly region (not depicted), each pair of collinear rollers has a slightly greater angle until conveyor belt 406 reaches a desired angle. A simplistic illustration of this process is depicted in FIG. 13.

Figure 8:
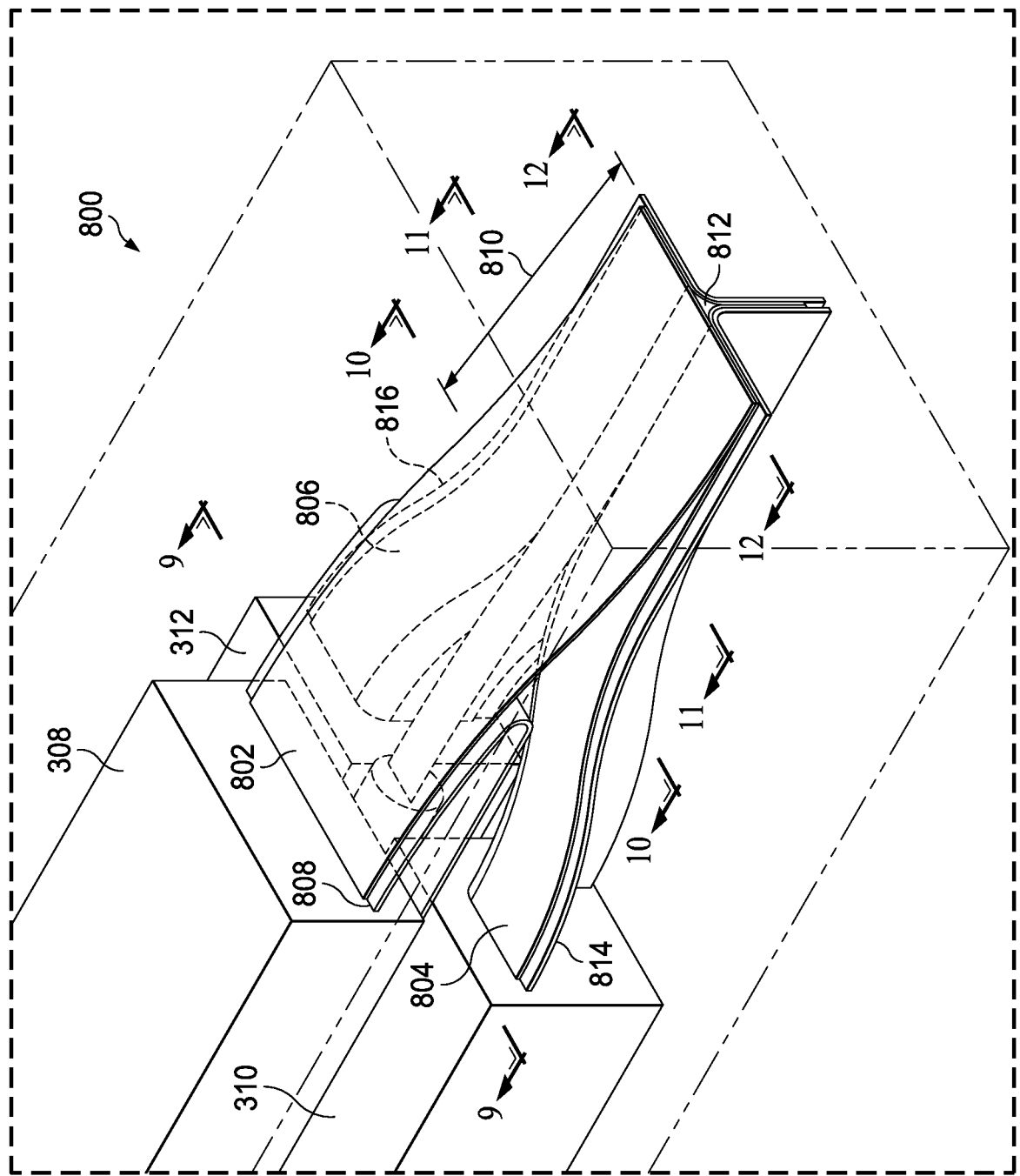
FIG. 8 is an illustration of a perspective view of composite charges exiting a plurality of charge forming stations of a composite structure forming system in accordance with an illustrative example.

Turning now to FIG. 8, an illustration of a perspective view of composite charges exiting a plurality of charge forming stations of a composite structure forming system is depicted in accordance with an illustrative example. FIG. 8 is a view within box 8 of FIG. 3. In view 800, base charge 802 exits base charge forming station 308, second charge 804 exits second charge forming station 310, and third charge 806 exits third charge forming station 312.

As base charge 802 exits base charge forming station 308, base charge 802 is supported by base charge conveyor belt 808. Base charge conveyor belt 808 extends only a short distance past base charge forming station 308. Base charge conveyor belt 808 exits base charge forming station 308 and reverses direction.

After base charge conveyor belt 808 reverses direction, base charge 802 is unsupported for distance 810. Base charge 802 being unsupported for distance 810 allows for composite noodle 812 to be introduced between base charge 802 and second charge 804 and third charge 806.

As second charge 804 exits second charge forming station 310, second charge 804 is supported by second charge conveyor belt 814. Second charge conveyor belt 814 carries second charge 804 through a structure assembly region (not depicted). In structure assembly region (not depicted) second charge conveyor belt 814 will provide pressure to second charge 804 to press second charge 804 against third charge 806.

As third charge 806 exits third charge forming station 312, third charge 806 is supported by third charge conveyor belt 816. Third charge conveyor belt 816 carries third charge 806 through the structure assembly region (not depicted). In the structure assembly region (not depicted) third charge conveyor belt 816 will provide pressure to third charge 806 to press third charge 806 against second charge 804.

Figure 9:
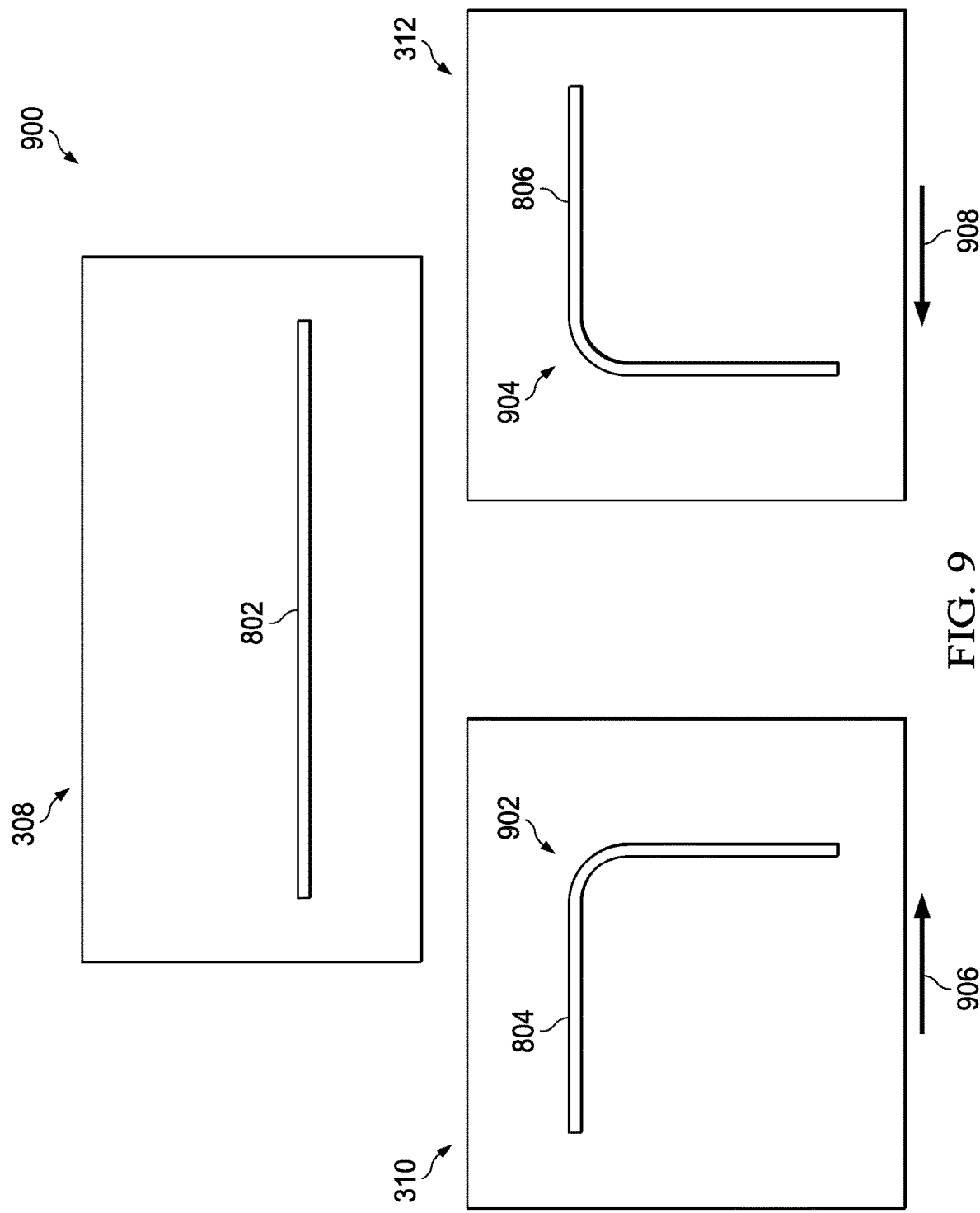
FIG. 9 is an illustration of a cross-sectional view of composite charges exiting a plurality of charge forming stations of a composite structure forming system in accordance with an illustrative example.

Turning now to FIG. 9, an illustration of a cross-sectional view of composite charges exiting a plurality of charge forming stations of a composite structure forming system is depicted in accordance with an illustrative example. View 900 is a cross-sectional view of base charge 802 exiting base charge forming station 308, second charge 804 exiting second charge forming station 310, and third charge 806 exiting third charge forming station 312. Base charge 802, second charge 804, and third charge 806 will be joined with a composite noodle to form a contoured elongate composite structure, such as contoured elongate composite structure 104 of FIG. 1.

Base charge 802, second charge 804, and third charge 806 are configured to be joined together to form a contoured elongate composite structure. In this illustrative example, the contoured elongate composite structure formed from base charge 802, second charge 804, and third charge 806 will take the form of a blade stringer having a "T" cross section. Other cross sections could be possible.

Second charge 804 has L-shaped cross-section 902. Third charge 806 has L-shaped cross-section 904. Second charge 804 and third charge 806 will form a blade of the blade stringer.

As a portion of second charge 804 and a portion of third charge 806 move towards a structure assembly region (not depicted), the respective portions of second charge 804 and third charge 806 will move toward each other. After a portion of second charge 804 exits second charge forming station 310 and moves towards a structure assembly region (not depicted), the portion of second charge 804 moves in direction 906 towards third charge 806. After a portion of third charge 806 exits third charge forming station 312 and moves towards a structure assembly region (not depicted), the portion of third charge 806 moves in direction 908 towards second charge 804.

The illustration of FIG. 9 is not meant to imply physical or architectural limitations to the manner in which an illustrative example may be implemented. For example, although each of base charge forming station 308, second charge forming station 310, and third charge forming station 312 are depicted with rectangular housings, these are only for illustrative purposes. Any of the charge forming stations may have differently shaped housings, more complex housings, or no housings. As another example, although each of base charge forming station 308, second charge forming station 310, and third charge forming station 312 are depicted with openings having the same cross-sectional shape as an expelled charge, in some illustrative examples the opening of each respective charge forming station is sized to allow for any cross-sectional shape of composite charge.

Figure 10:
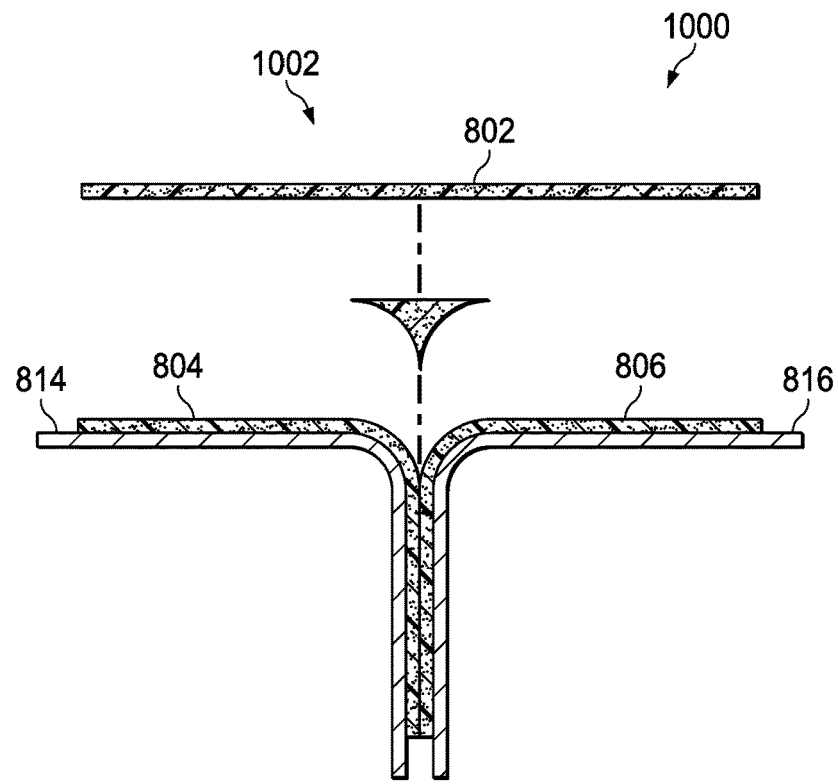
FIG. 10 is an illustration of a cross-sectional view of composite charges being pressed together in a composite structure forming system in accordance with an illustrative example.

Turning now to FIG. 10, an illustration of a cross-sectional view of composite charges being pressed together in a composite structure forming system is depicted in accordance with an illustrative example. View 1000 is a cross-sectional view within a structure assembly region of a composite structure forming system. View 1000 is a physical implementation of structure assembly region 150 of composite structure forming system 102 of FIG. 1. View 1000 is a cross-sectional view of second charge 804 and third charge 806 being pressed together in composite structure forming system 300.

View 1000 is a cross-sectional view of base charge 802, second charge 804, and third charge 806 within structure assembly region 1002. Structure assembly region 1002 is a physical implementation of structure assembly region 150 of FIG. 1. In view 1000, second charge conveyor belt 814 provides pressure to second charge 804 to press second charge 804 against third charge 806. In view 1000, third charge conveyor belt 816 provides pressure to third charge 806 to press third charge 806 against second charge 804.

Figure 11:
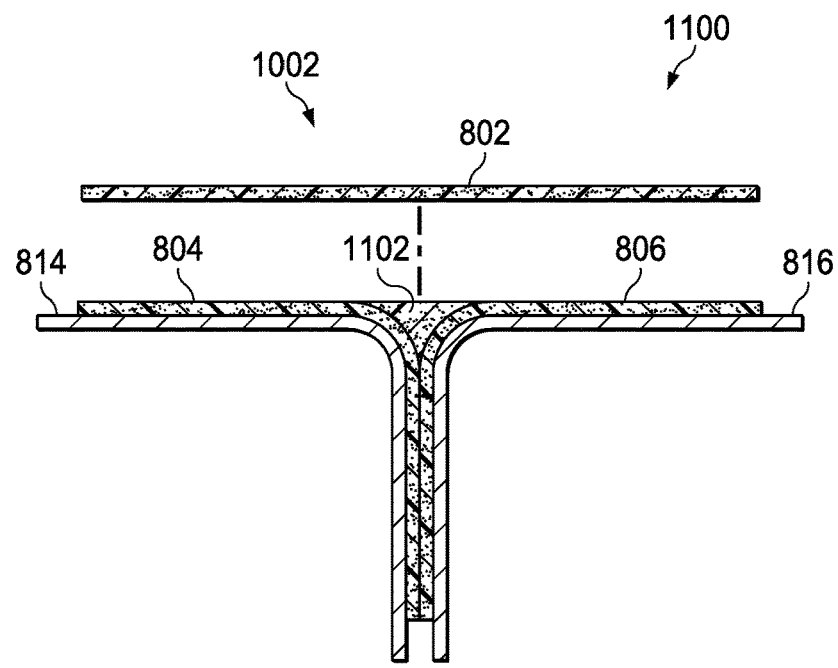
FIG. 11 is an illustration of a cross-sectional view of a composite noodle being extruded onto composite charges in a composite structure forming system in accordance with an illustrative example.

Turning now to FIG. 11, an illustration of a cross-sectional view of a composite noodle being extruded onto composite charges in a composite structure forming system is depicted in accordance with an illustrative example. View 1100 is a cross-sectional view within a structure assembly region of a composite structure forming system. View 1100 is a physical implementation of structure assembly region 150 of composite structure forming system 102 of FIG. 1. View 1100 is a cross-sectional view of composite noodle 1102 being extruded onto second charge 804 and third charge 806 in composite structure forming system 300.

Figure 12:
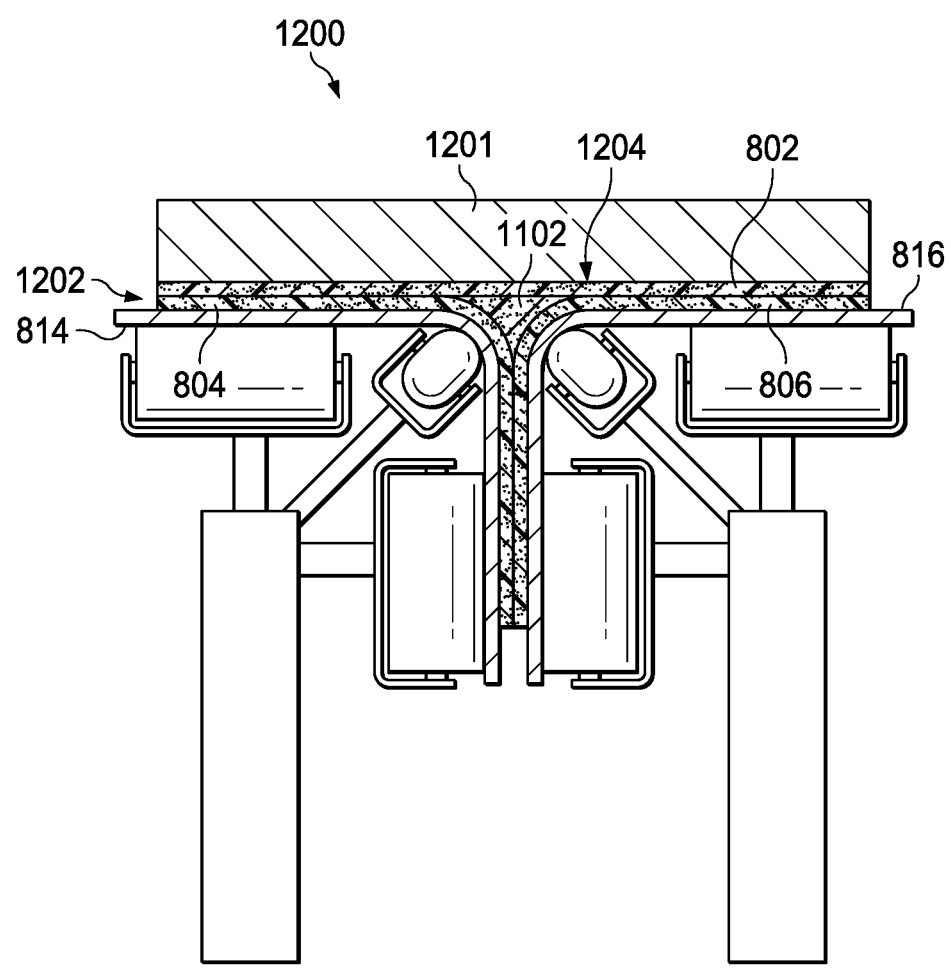
FIG. 12 is an illustration of a cross-sectional view of compaction being applied to a base charge in a composite structure forming system in accordance with an illustrative example.

Turning now to FIG. 12, an illustration of a cross-sectional view of compaction being applied to a base charge in a composite structure forming system is depicted in accordance with an illustrative example. View 1200 is a cross-sectional view within a structure assembly region of a composite structure forming system. View 1200 is a physical implementation of structure assembly region 150 of composite structure forming system 102 of FIG. 1. View 1200 is a cross-sectional view of pressure being applied to base charge 802 to adhere base charge 802 to composite noodle 1102, second charge 804, and third charge 806 in composite structure forming system 300. As depicted, compaction roller 1201 applies pressure to base charge 802.

During compaction, support rollers 1206 support second charge conveyor belt 814 and support rollers 1208 support third charge conveyor belt 816. Support rollers 1206 and support rollers 1208 reacts against the force supplied by compaction roller 1201. Compaction roller 1201 and support rollers 1206 form a compaction nip when pressure is applied to form contoured elongate composite structure 1202.

After pressure is applied to base charge 802, base charge 802, composite noodle 1102, second charge 804, and third charge 806 exit composite structure forming system 300 as contoured elongate composite structure 1202. In this illustrative example, contoured elongate composite structure 1202 takes the form of blade stringer 1204. Contoured elongate composite structure 1202 of FIG. 12 is a non-limiting example of contoured elongate composite structure 104 of FIG. 1. In other illustrative examples, contoured elongate composite structures with different cross-sectional shapes may be formed by composite structure forming system 300.

Turning now to FIG. 13, an illustration of a perspective view of a composite charge as its cross-section is modified is depicted in accordance with an illustrative example. View 1300 is a simplistic and non-limiting illustration of modifying a cross-sectional shape of composite charge 1302 after composite charge 1302 is laid up on conveyor belt 406 while conveyor belt 406 is substantially flat.

In view 1300 each composite tape layer of composite charge 1302 has been applied, and the cross-sectional shape of conveyor belt 406 is changed. In view 1300, the cross-sectional shape of conveyor belt 406 is changed before conveyor belt 406 reaches a structure assembly region (not depicted). As depicted, conveyor belt 406 is gradually changed to an L-shape.

As depicted, the shape of plurality of support rollers 422 gradually changes. As conveyor belt 406 approaches a structure assembly region (not depicted), each set of rollers of plurality of support rollers 422 has a slightly greater angle until conveyor belt 406 reaches a desired angle.

Figure 14:
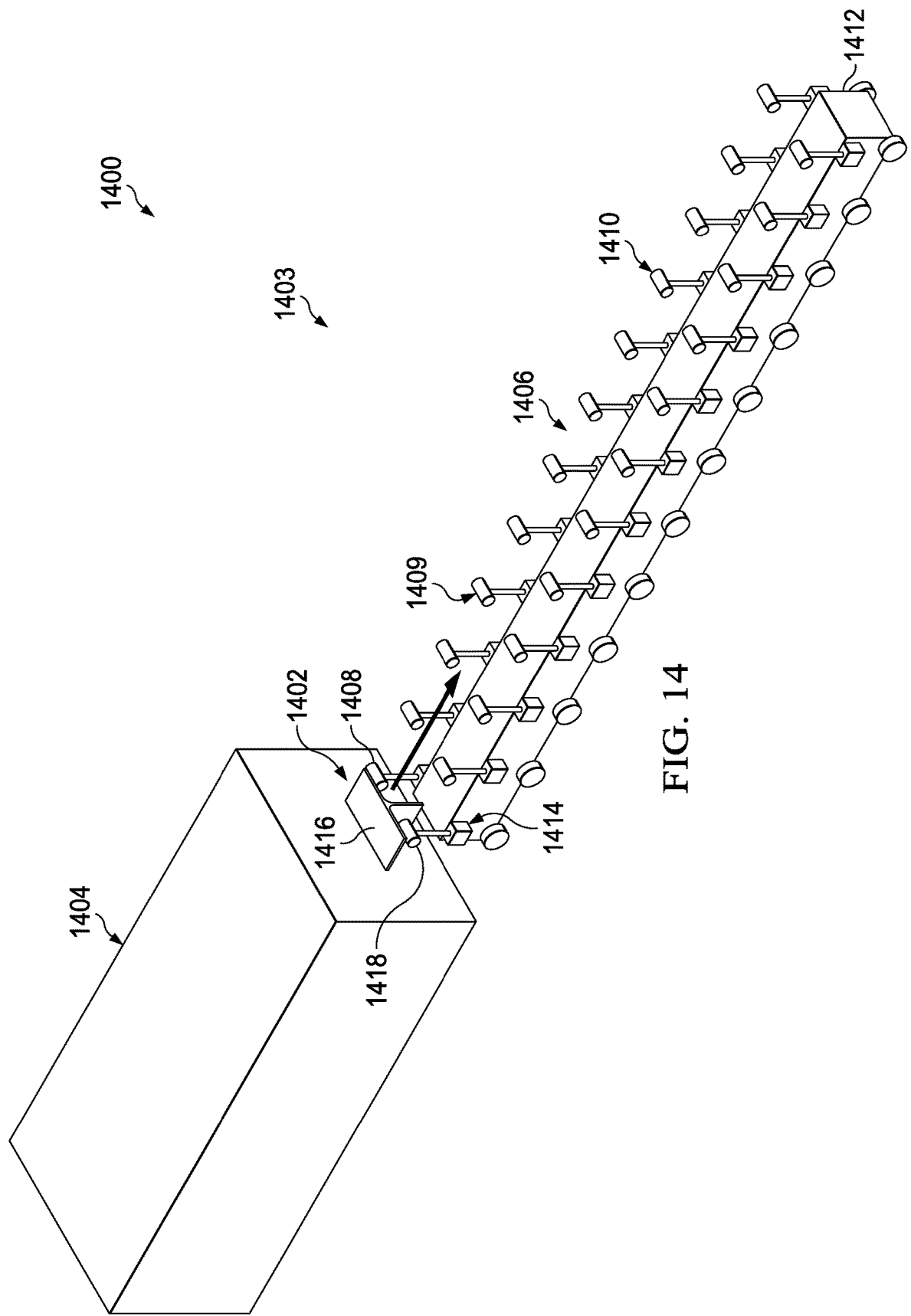
FIG. 14 is an illustration of a perspective view of a contoured elongate composite structure exiting a composite structure forming system and being received by a contoured elongate composite structure receipt and transportation system in accordance with an illustrative example.

Turning now to FIG. 14, an illustration of a perspective view of a contoured elongate composite structure exiting a composite structure forming system and being received by a contoured elongate composite structure receipt and transportation system is depicted in accordance with an illustrative example. View 1400 is a view within a manufacturing environment, such as manufacturing environment 100 of FIG. 1. Contoured elongate composite structure 1402 is formed within manufacturing environment 1403. Contoured elongate composite structure 1402 is a physical implementation of contoured elongate composite structure 104 of FIG. 1. Contoured elongate composite structure 1402 is formed in a continuous process by composite structure forming system 1404. Composite structure forming system 1404 is a physical implementation of composite structure forming system 102 of FIG. 1. In some illustrative example, composite structure forming system 1404 is the same as composite structure forming system 300 of FIG. 3.

After exiting composite structure forming system 1404, contoured elongate composite structure 1402 is received by contoured elongate composite structure receipt and transportation system 1406. Contoured elongate composite structure receipt and transportation system 1406 is a physical implementation of contoured elongate composite structure receipt and transportation system 106 of FIG. 1.

Contoured elongate composite structure receipt and transportation system 106 comprises conveyor belt 1408 and plurality of moveable supports 1409. As depicted, plurality of moveable supports 1409 take the form of plurality of moveable support rollers 1410. Conveyor belt 1408 is configured to travel across plurality of moveable support rollers 1410 at a rate equal to the expulsion rate of contoured elongate composite structure 1402 from composite structure forming system 1404.

Contoured elongate composite structure 1402 is received by conveyor belt 1408 of contoured elongate composite structure receipt and transportation system 106. Conveyor belt 1408 moves across plurality of moveable support rollers 1410 of contoured elongate composite structure receipt and transportation system 1406. Plurality of moveable support rollers 1410 support a contour of contoured elongate composite structure 1402.

As conveyor belt 1408 and contoured elongate composite structure 1402 move across plurality of moveable support rollers 1410, plurality of moveable support rollers 1410 is moved vertically relative to structural frame 1412 of contoured elongate composite structure receipt and transportation system 1406 to support a contour of contoured elongate composite structure 1402. Each of plurality of moveable support rollers 1410 is moveable perpendicular to the longitudinal direction of contoured elongate composite structure 1402. In some illustrative examples, each of plurality of moveable support rollers 1410 is moveable in multiple planes. For example, each of plurality of moveable support rollers 1410 may be pivotable to support an angle in the cross-sectional shape of contoured elongate composite structure 1402.

Independent movement of each of plurality of moveable support rollers 1410 is controlled using a controller (not depicted) of contoured elongate composite structure receipt and transportation system 1406. In some illustrative examples, movement of each of plurality of moveable support rollers 1410 is controlled based on a design for contoured elongate composite structure 1402. In some illustrative examples, a program is run for movement of each of plurality of moveable support rollers 1410 based on a design for contoured elongate composite structure 1402. In some illustrative examples, each of plurality of moveable support rollers 1410 is moved in response to measurements from proximity sensors.

Plurality of moveable support rollers 1410 is moved using plurality of displacement systems 1415. Plurality of displacement systems 1415 connect plurality of moveable support rollers 1410 to structural frame 1412 and is configured to move plurality of moveable support rollers 1410 vertical relative to structural frame 1412.

Plurality of displacement systems 1415 is independently controllable. Each of plurality of displacement systems 1415 is moveable to support contoured elongate composite structure 1402.

Contoured elongate composite structure receipt and transportation system 1406 further comprises controller (not depicted) configured to control plurality of displacement systems 1415 independently such that plurality of moveable support rollers 1410 support a contour of contoured elongate composite structure 1402. As contoured elongate composite structure 1402 moves across contoured elongate composite structure receipt and transportation system 1406, plurality of moveable support rollers 1410 move to support contoured elongate composite structure 1402.

As contoured elongate composite structure 1402 moves across contoured elongate composite structure receipt and transportation system 1406 the rollers of plurality of moveable support rollers 1410 are relocated to a position to accommodate a contour, twist or joggle and then adjusted to another position relative to contoured elongate composite structure 1402 as the contour, twist or joggle passes along contoured elongate composite structure receipt and transportation system 1406 to a final position. In the final position, contoured elongate composite structure receipt and transportation system 1406 accommodates the entire contoured elongate composite structure 1402.

In some illustrative examples, contoured elongate composite structure receipt and transportation system 1406 has more than one conveyor belt. As depicted, contoured elongate composite structure 1402 takes the form of blade stringer 1416. As depicted, a respective conveyor belt of contoured elongate composite structure receipt and transportation system 1406 supports each of a second charge and a third charge of contoured elongate composite structure 1402. As depicted, contoured elongate composite structure receipt and transportation system 1406 comprises conveyor belt 1408 and conveyor belt 1418. In some illustrative examples, contoured elongate composite structure receipt and transportation system 1406 may be described as an adjustable split conveyor belt tool.

As depicted, contoured elongate composite structure 1402 is blade stringer 1416 expelled from a composite structure forming system, such as composite structure forming system 102, in a blade-down configuration. In this illustrative example, contoured elongate composite structure receipt and transportation system 1406 is designed to support the weight of blade stringer 1416 by its flanges, with a slit or gap to allow the blade room to hang. As depicted, contoured elongate composite structure receipt and transportation system 1406 tool does not press against the blade.

In some illustrative examples, contoured elongate composite structure receipt and transportation system 1406 is parked, fixed with respect to a composite structure forming system, such as composite structure forming system 102, so long as the composite structure forming system is producing contoured elongate composite structure 1402. Once contoured elongate composite structure 1402 is complete, conveyor belt 1408 and conveyor belt 1418 stop rolling, contoured elongate composite structure 1402 remains fixed on contoured elongate composite structure receipt and transportation system 1406, and contoured elongate composite structure receipt and transportation system 1406 is wheeled out to where contoured elongate composite structure 1402 is desired, such as for transfer to a cure tool.

In other illustrative examples, contoured elongate composite structure receipt and transportation system 1406 is moved relative to composite structure forming system 1404 at a speed equal to the expulsion rate of contoured elongate composite structure 1402 from composite structure forming system 1404. In these illustrative examples, plurality of moveable support rollers 1410 are moved to either prior to expulsion or during expulsion of contoured elongate composite structure 1402 to support contoured elongate composite structure 1402. In some illustrative examples, plurality of moveable support rollers 1410 may be moved to a set position based on a design for contoured elongate composite structure 1402 prior to expulsion of contoured elongate composite structure 1402 from composite structure forming system 1404. In these illustrative examples, contoured elongate composite structure receipt and transportation system 1406 advances with the advancing contoured elongate composite structure 1402. Therefore, the leading end of contoured elongate composite structure 1402 exits composite structure forming system 1404 and comes to rest on the leading end of contoured elongate composite structure receipt and transportation system 1406. Then contoured elongate composite structure receipt and transportation system 1406 advances relative to composite structure forming system 1404 at a rate equal to the rate that contoured elongate composite structure 1402 advances out of composite structure forming system 1404 until the trailing end of contoured elongate composite structure 1402 is deposited on the trailing end of contoured elongate composite structure receipt and transportation system 1406.

Figure 15:
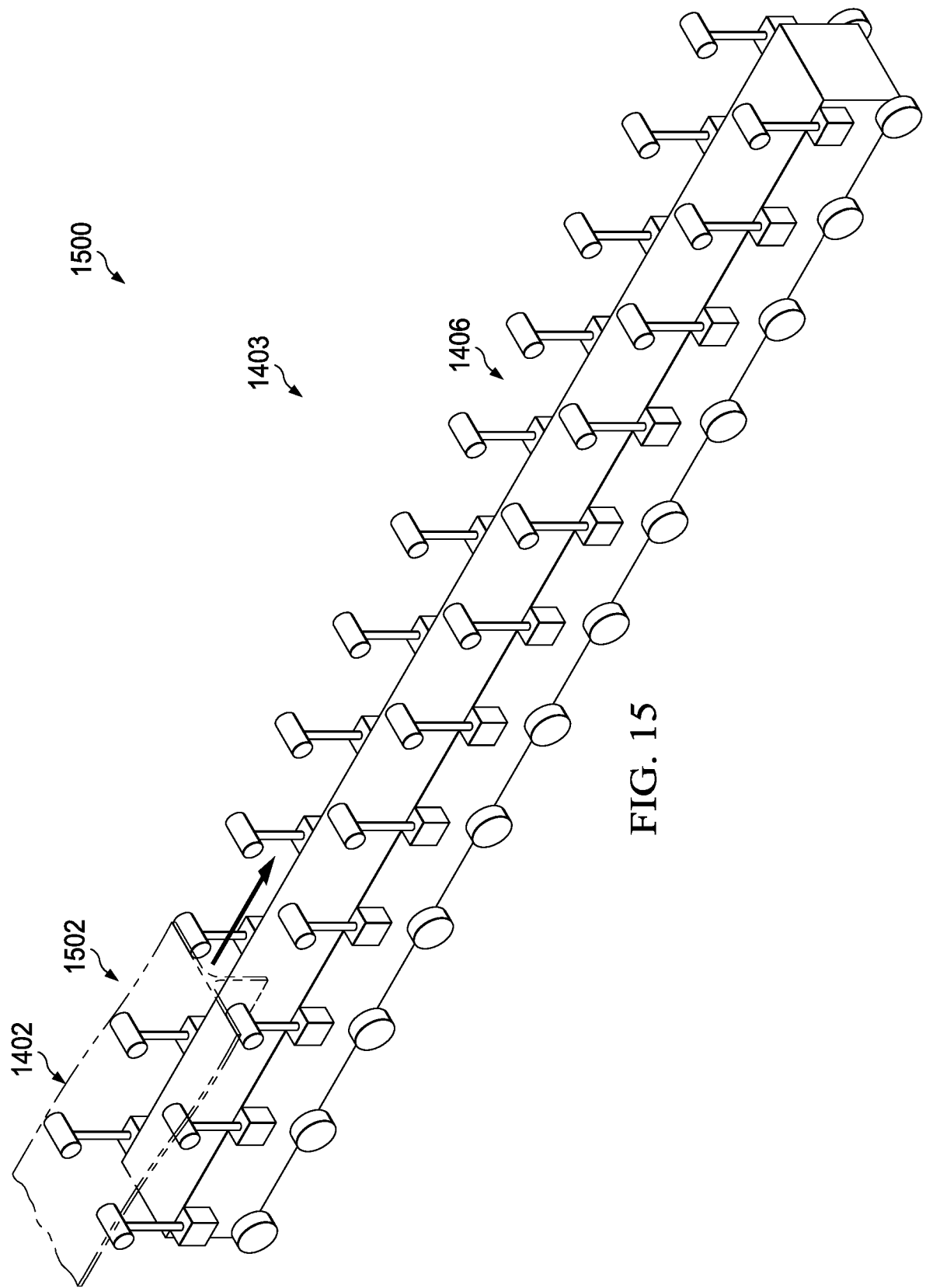
FIG. 15 is an illustration of a perspective view of a contoured elongate composite structure moving across a contoured elongate composite structure receipt and transportation system in accordance with an illustrative example.

Turning now to FIG. 15, an illustration of a perspective view of a contoured elongate composite structure moving across a contoured elongate composite structure receipt and transportation system is depicted in accordance with an illustrative example. View 1500 is a view of manufacturing environment 1403 as contoured elongate compositestructure 1402 moves across contoured elongate composite structure receipt and transportation system 1406. Plurality of moveable support rollers 1410 have moved between view 1400 and view 1500 to support contour 1502 of contoured elongate composite structure 1402.

Figure 16:
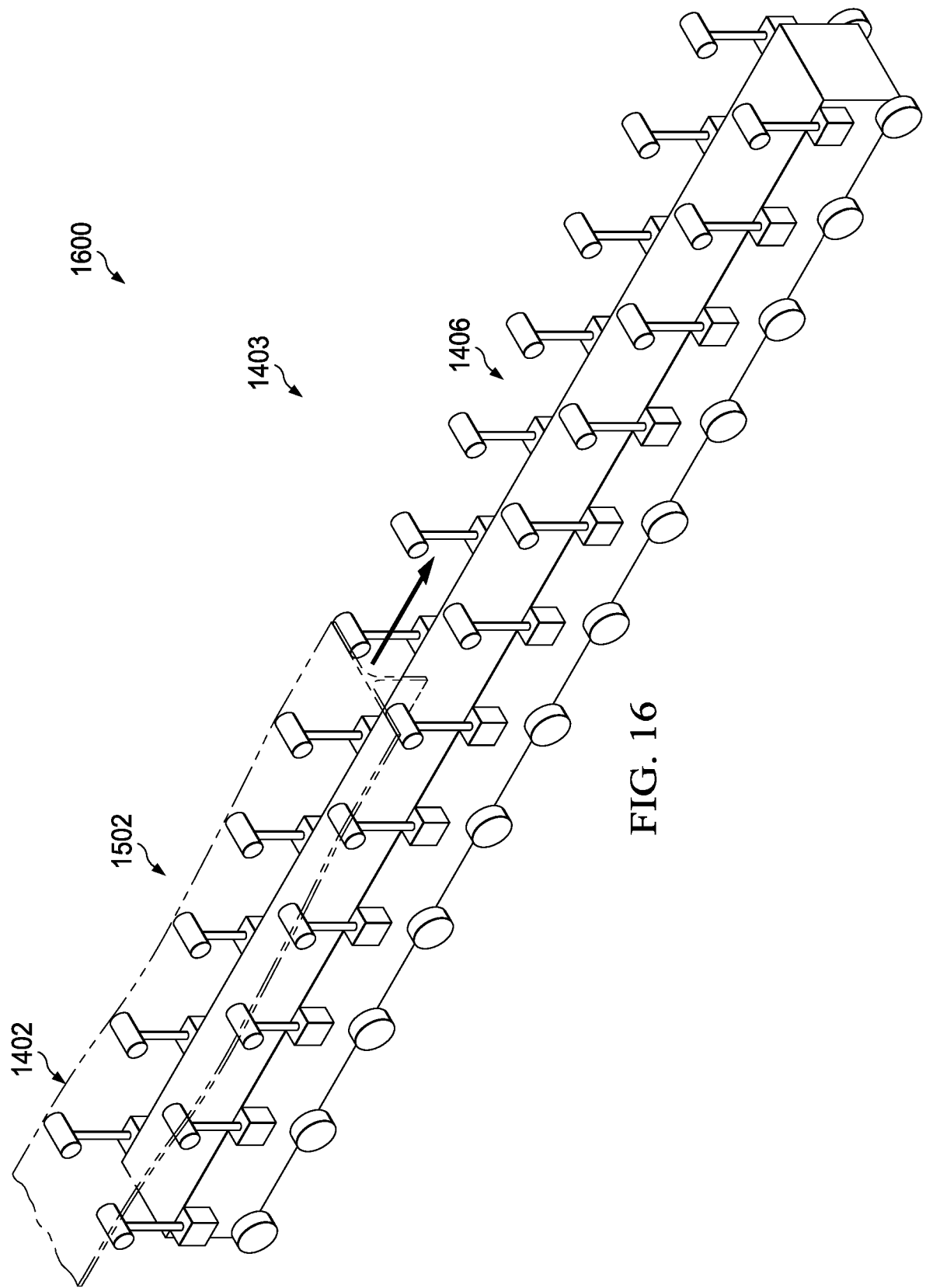
FIG. 16 is an illustration of a perspective view of a contoured elongate composite structure moving across a contoured elongate composite structure receipt and transportation system in accordance with an illustrative example.

Turning now to FIG. 16, an illustration of a perspective view of a contoured elongate composite structure moving across a contoured elongate composite structure receipt and transportation system is depicted in accordance with an illustrative example. View 1600 is a view of manufacturing environment 1403 as contoured elongate composite structure 1402 moves across contoured elongate composite structure receipt and transportation system 1406. Plurality of moveable support rollers 1410 have moved between view 1500 and view 1600 to support contour 1502 of contoured elongate composite structure 1402.

Figure 17:
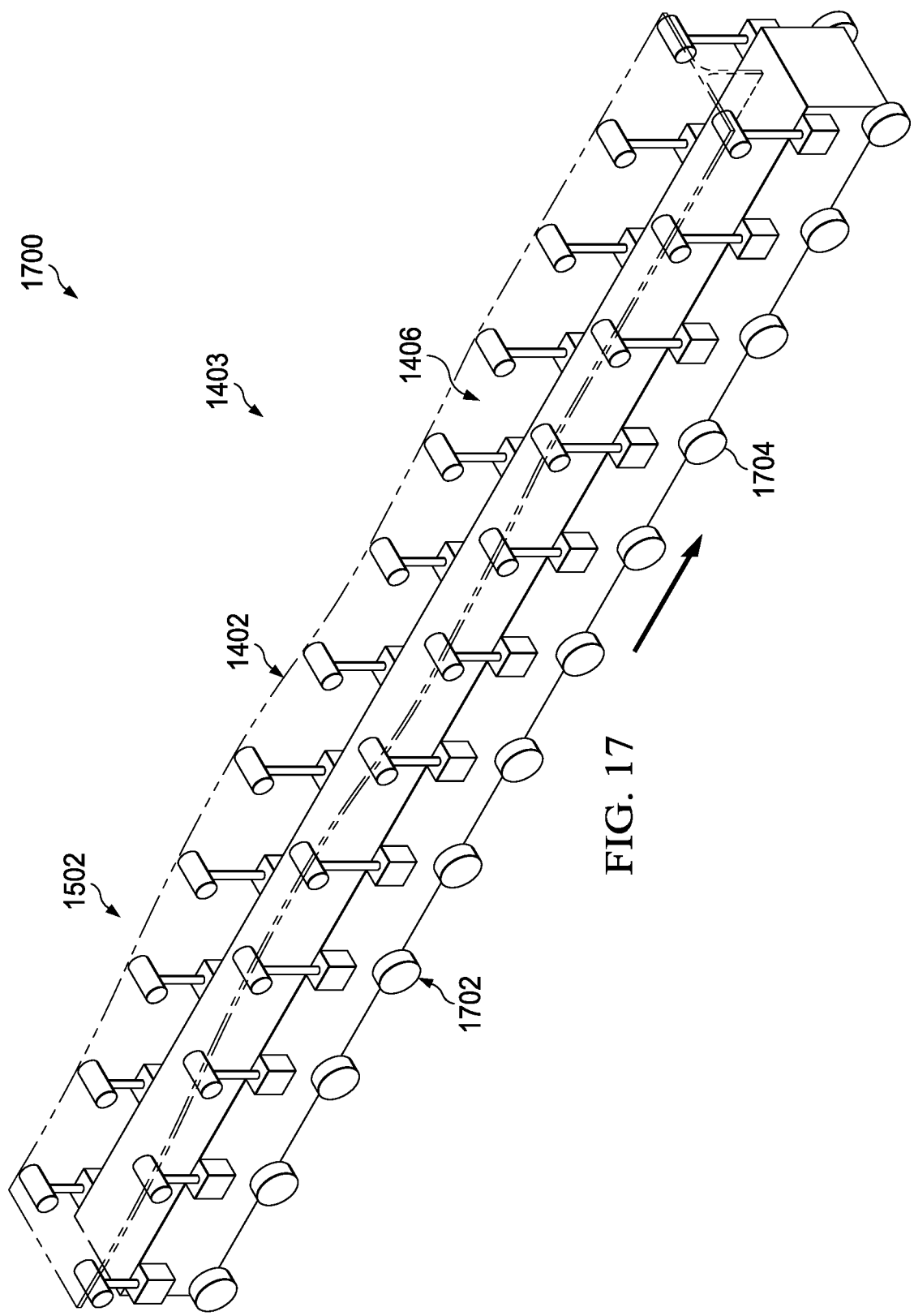
FIG. 17 is an illustration of a perspective view of a contoured elongate composite structure on a contoured elongate composite structure receipt and transportation system moving within a manufacturing environment in accordance with an illustrative example.

Turning now to FIG. 17, an illustration of a perspective view of a contoured elongate composite structure on a contoured elongate composite structure receipt and transportation system moving within a manufacturing environment is depicted in accordance with an illustrative example. In view 1700, contoured elongate composite structure 1402 is resting on contoured elongate composite structure receipt and transportation system 1406. In view 1700, contoured elongate composite structure receipt and transportation system 1406 is moved within manufacturing environment 1403. Contoured elongate composite structure receipt and transportation system 1406 moves within manufacturing environment 1403 using movement system 1702. In this illustrative example, movement system 1702 includes wheels 1704.

Contoured elongate composite structure receipt and transportation system 1406 is moved to where it is desirable to place contoured elongate composite structure 1402. For example, contoured elongate composite structure receipt and transportation system 1406 may move towards a curing tool. As another example, contoured elongate composite structure receipt and transportation system 1406 may move towards a composite layup, such as an aircraft wingskin.

After contoured elongate composite structure receipt and transportation system 1406 is moved away from a composite structure forming system, such as composite structure forming system 102, another contoured elongate composite structure receipt and transportation system (not depicted) is moved towards the composite structure forming system to receive another contoured elongate composite structure. In some illustrative examples, the next contoured elongate composite structure receipt and transportation system (not depicted) has a same design as contoured elongate composite structure receipt and transportation system 1406. In some illustrative examples, the next contoured elongate composite structure receipt and transportation system (not depicted) has a different design from contoured elongate composite structure receipt and transportation system 1406. For example, the next contoured elongate composite structure receipt and transportation system (not depicted) may have one of a different quantity of conveyor belts, a different height, a different length, or other desirable characteristic.

Figure 18A:
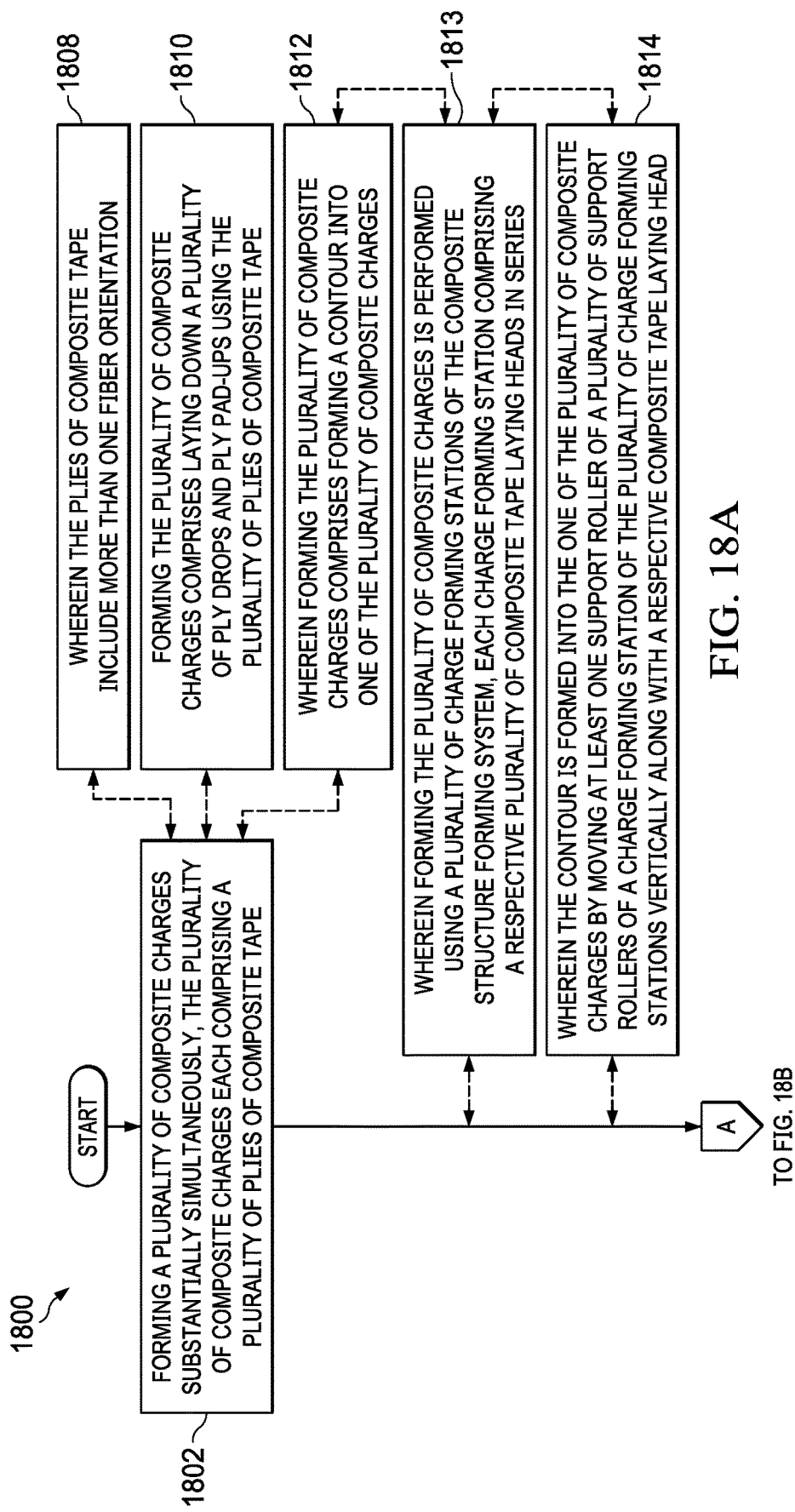
FIGS. 18A and 18B is an illustration of a flowchart of a method of forming a contoured elongate composite structure using a composite structure forming system in accordance with an illustrative example.
Figure 18B:
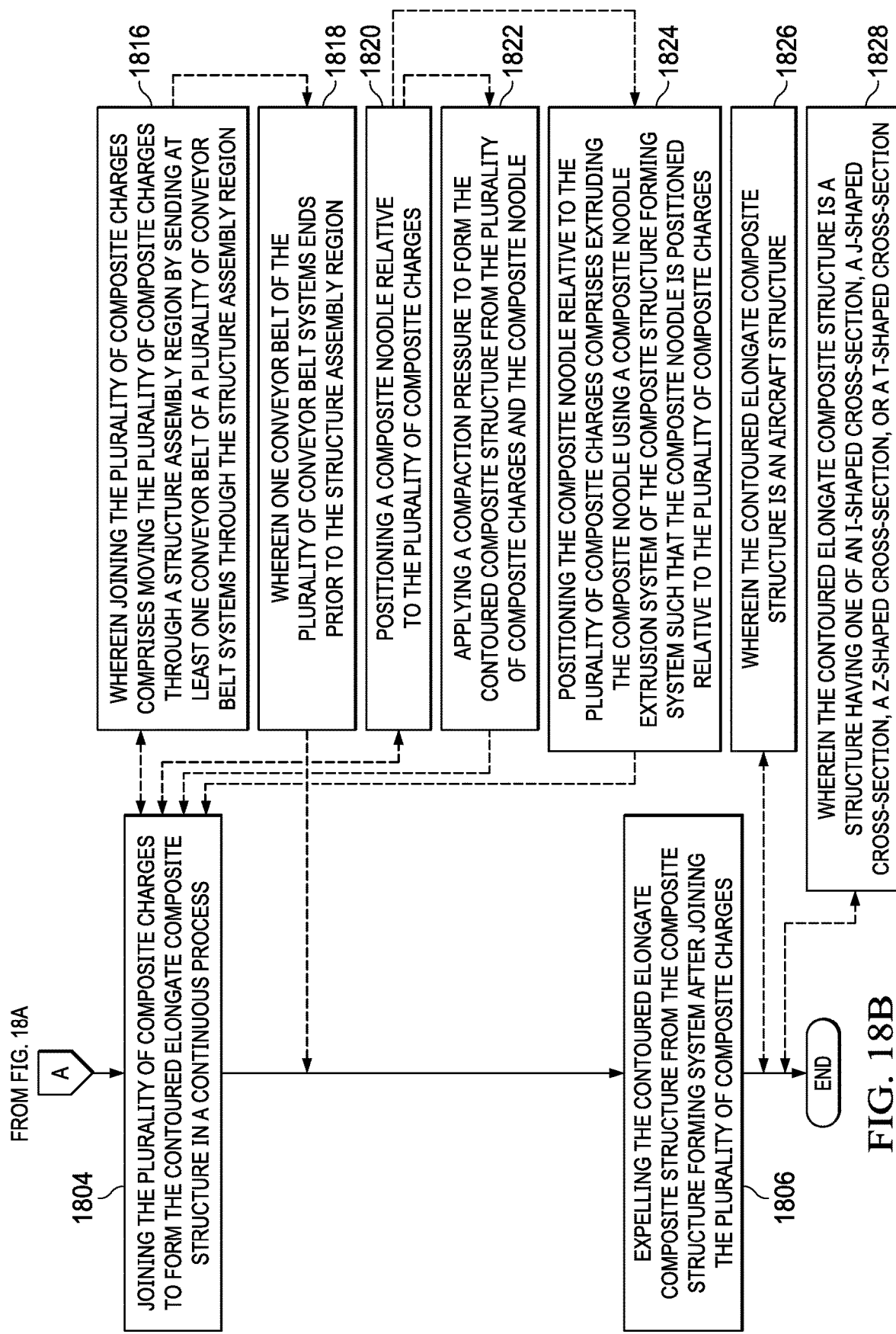

Turning now to FIGS. 18A and 18B, an illustration of a flowchart of a method of forming a contoured elongate composite structure using a composite structure forming system is depicted in accordance with an illustrative example. Method 1800 may be implemented by composite structure forming system 102 in manufacturing environment 100 of FIG. 1. Method 1800 may be implemented by composite structure forming system 202 in manufacturing environment 200 of FIG. 2. Method 1800 may be implemented by composite structure forming system 300 of FIG. 3. Charge forming station 402 of FIGS. 4-7 may be used to perform method 1800. Views 800-1000 of FIGS. 8-10 may be views of a plurality of composite charges formed by method 1800. View 1100 may be a view of a composite noodle extruded and positioned according to method 1800.

Method 1800 forms a plurality of composite charges simultaneously, the plurality of composite charges each comprising a plurality of plies of composite tape (operation 1802). Method 1800 joins the plurality of composite charges to form the contoured elongate composite structure in a continuous process (operation 1804). Method 1800 expels the contoured elongate composite structure from the composite structure forming system after joining the plurality of composite charges (operation 1806). Afterwards, the method terminates.

In some illustrative examples, the plies of composite tape include more than one fiber orientation (operation 1808). The plies of composite tape may have any desirable orientation, such as at least one of 0°, 90°, 30°, 60°, 45°, or any other desirable fiber orientation. The fiber orientation for each composite tape laying head is selected based on a desired orientation for a ply to be laid by the respective composite tape laying head. The composite tape for each composite tape laying head is exchanged depending on a desired layup.

In some illustrative examples, forming the plurality of composite charges comprises laying down a plurality of ply drops and ply pad-ups using the plurality of plies of composite tape (operation 1810). To form a ply drop, a desired quantity of composite tape laying heads stops laying down composite tape to decrease the thickness of a layup. To form a ply pad-up, a desired quantity of composite tape laying heads begins laying down composite tape to increase the thickness of a layup.

In some illustrative examples, forming the plurality of composite charges comprises forming a contour into one of the plurality of composite charges (operation 1812). In some illustrative examples, forming the plurality of composite charges is performed using a plurality of charge forming stations of the composite structure forming system, each charge forming station comprising a respective plurality of composite tape laying heads in series (operation 1813). In some illustrative examples, the contour is formed into the one of the plurality of composite charges by moving at least one support roller of a plurality of support rollers of a charge forming station of the plurality of charge forming stations vertically along with a respective composite tape laying head (operation 1814).

In some illustrative examples, joining the plurality of composite charges comprises moving the plurality of composite charges through a structure assembly region by sending at least one conveyor belt of a plurality of conveyor systems through the structure assembly region (operation 1816). In these illustrative examples, the at least one conveyor belt transports at least one composite charge of the plurality of composite charges. In some illustrative examples, the at least one conveyor belt comprises a second charge conveyor belt supporting a second charge and a third charge conveyor belt supporting a third charge.

In some illustrative examples, one conveyor belt of the plurality of conveyor systems ends prior to the structure assembly region (operation 1818). In some illustrative examples, a base charge conveyor belt does not enter the structure assembly region. In some illustrative examples, a base charge enters the structure assembly region unsupported by a conveyor belt.

For example, base charge conveyor belt 808 extends only a short distance past base charge forming station 308. Base charge conveyor belt 808 exits base charge forming station 308 and reverses direction.

In some illustrative examples, method 1800 positions a composite noodle relative to the plurality of composite charges (operation 1820). In some illustrative examples, positioning the composite noodle relative to the plurality of composite charges comprises extruding a composite noodle using a composite noodle extrusion system of the composite structure forming system such that the composite noodle is positioned relative to the plurality of composite charges (operation 1824). In some illustrative examples, method 1800 further comprises applying a compaction pressure to form the contoured elongate composite structure from the plurality of composite charges and the composite noodle (operation 1822). For example, in view 1200, a compaction pressure is applied to plurality of composite charges 322 and composite noodle 1102 to form contoured elongate composite structure 1202.

In some illustrative examples of method 1800 the contoured elongate composite structure is a having one of an I-shaped cross-section, a J-shaped cross-section, a Z-shaped cross-section, or a T-shaped cross-section (operation 1828). For example, elongate composite structure 1402 of FIG. 14 is a blade structure having a T-shaped cross-section. In some illustrative examples, the contoured elongate composite structure is an aircraft structure (operation 1826).

Figure 19:
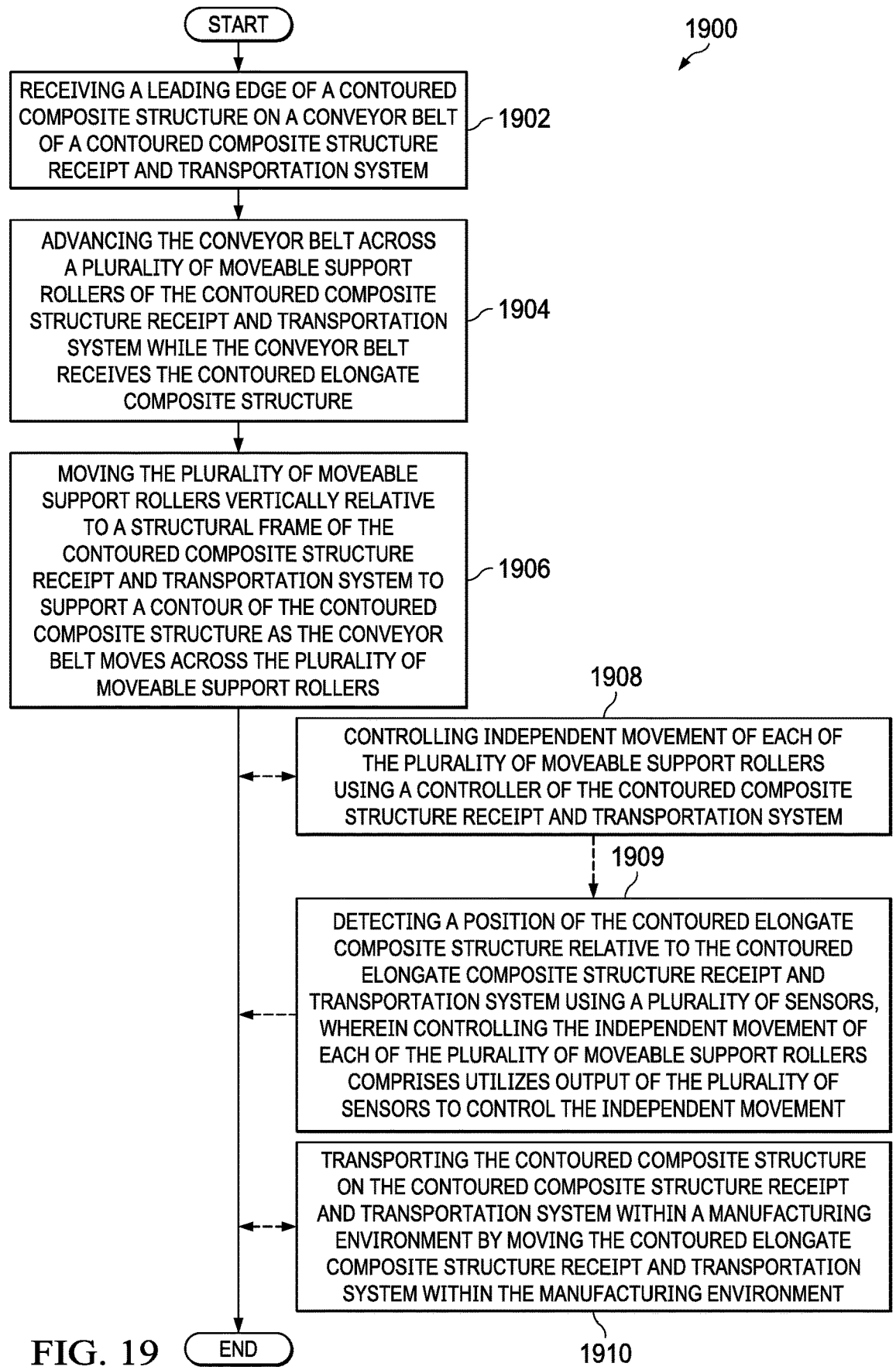
FIG. 19 is an illustration of a flowchart of a method for receiving a contoured elongate composite structure in accordance with an illustrative example.

Turning now to FIG. 19, an illustration of a flowchart of a method for receiving a contoured elongate composite structure is depicted in accordance with an illustrative example. Method 1900 may receive and transport contoured elongate composite structure 104 of FIG. 1. Method 1900 may be implemented using contoured elongate composite structure receipt and transportation system 106 of FIG. 1. Method 1900 may be implemented within manufacturing environment 200 using contoured elongate composite structure receipt and transportation system 206 of FIG. 2. Composite structure forming system 300 may be used to form a contoured elongate composite structure received and moved by method 1900. Charge forming station 402 of FIGS. 4-7 may be used to form a component of a contoured elongate composite structure to be received and moved by method 1900. A contoured elongate composite structure formed from plurality of composite charges in views 800-1210 of FIGS. 8-12 may be received and moved using method 1900. Method 1900 may be performed using contoured elongate composite structure receipt and transportation system 1406 of FIGS. 14-17. Method 1900 may receive and move a contoured elongate composite structure formed by method 1800.

Method 1900 receives a leading edge of a contoured elongate composite structure on a conveyor belt of a contoured elongate composite structure receipt and transportation system (operation 1902). Method 1900 advances the conveyor belt across a plurality of moveable support rollers of the contoured elongate composite structure receipt and transportation system while the conveyor belt receives the contoured elongate composite structure (operation 1904). Method 1900 moves the plurality of moveable support rollers vertically relative to a structural frame of the contoured elongate composite structure receipt and transportation system to support a contour of the contoured elongate composite structure as the conveyor belt moves across the plurality of moveable support rollers (operation 1906). Afterwards, the method terminates.

In some illustrative examples, method 1900 further comprises controlling independent movement of each of the plurality of moveable support rollers using a controller of the contoured elongate composite structure receipt and transportation system (operation 1908). In some illustrative examples, method 1900 detects a position of the contoured elongate composite structure relative to the contoured elongate composite structure receipt and transportation system using a plurality of sensors, wherein controlling the independent movement of each of the plurality of moveable support rollers comprises utilizes output of the plurality of sensors to control the independent movement (operation 1909). In some illustrative examples, method 1900 further comprises moving the contoured elongate composite structure on the contoured elongate composite structure receipt and transportation system within a manufacturing environment (operation 1910). In these illustrative examples, the contoured elongate composite structure receipt and transportation system moves within the manufacturing environment using a movement system. The movement system may include wheels.

Figure 20:
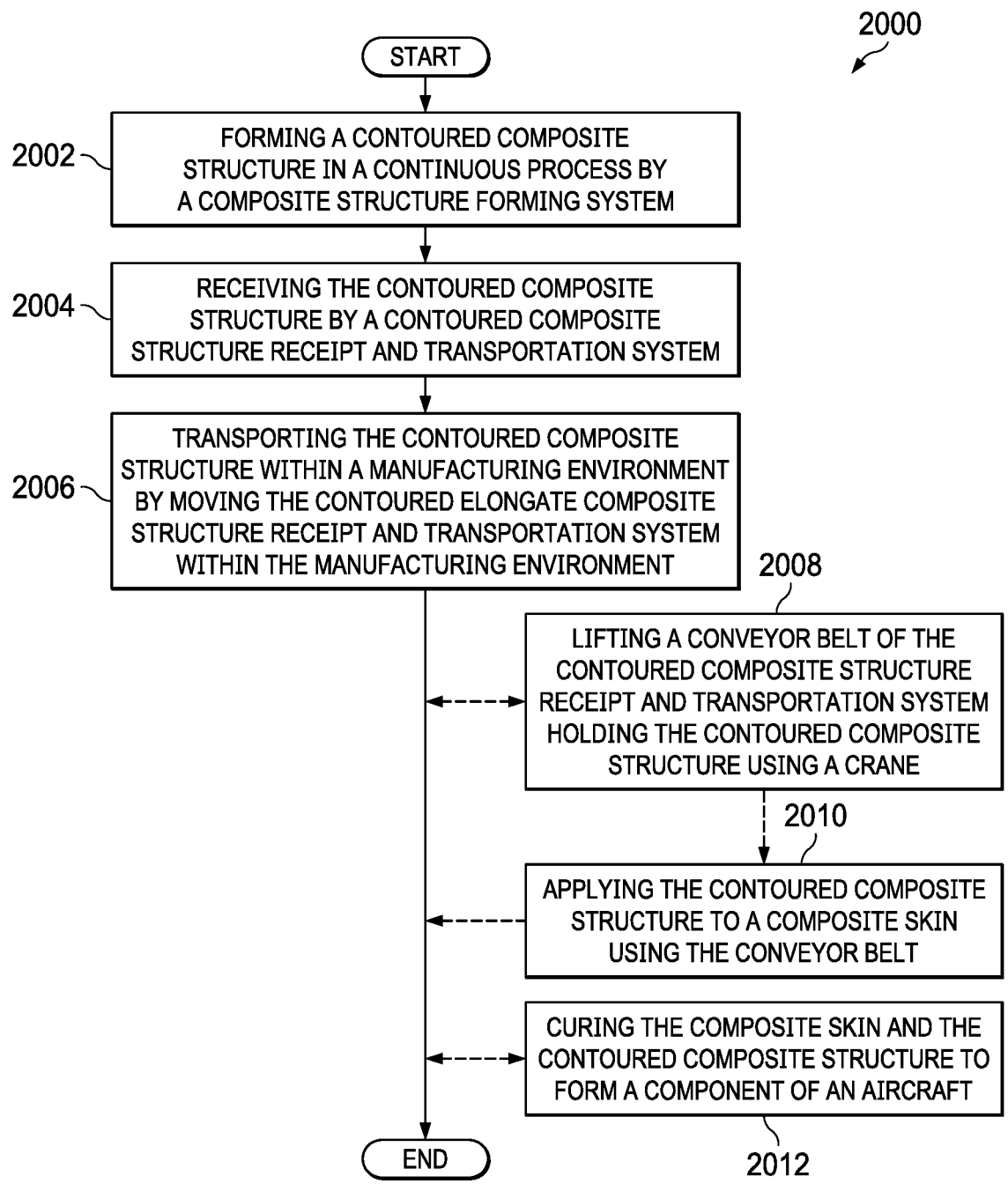
FIG. 20 is an illustration of a flowchart of a method for manufacturing and transporting a contoured elongate composite structure in accordance with an illustrative example.

Turning now to FIG. 20, an illustration of a flowchart of a method for manufacturing and transporting a contoured elongate composite structure is depicted in accordance with an illustrative example. Method 2000 may form, receive, and transport contoured elongate composite structure 104 of FIG. 1. Method 2000 may be implemented using composite structure forming system 102 and contoured elongate composite structure receipt and transportation system 106 of FIG. 1. Method 2000 may be implemented within manufacturing environment 200 using composite structure forming system 202 and contoured elongate composite structure receipt and transportation system 206 of FIG. 2. Composite structure forming system 300 may be used to form a contoured elongate composite structure of method 2000. Charge forming station 402 of FIGS. 4-7 may be used to form a component of a contoured elongate composite structure of method 2000. A contoured elongate composite structure of method 2000 may be formed from plurality of composite charges in views 800-1200 of FIGS. 8-12. Method 2000 may be performed using contoured elongate composite structure receipt and transportation system 1406 of FIGS. 14-17.

Method 2000 forms a contoured elongate composite structure in a continuous process by a composite structure forming system (operation 2002). The contoured elongate composite structure has any desirable cross-sectional shape. In some illustrative examples, the contoured elongate composite structure is formed from a plurality of composite charges. In some illustrative examples, the contoured elongate composite structure is formed from a plurality of composite charges and a composite noodle. The contoured elongate composite structure is laid up with the contour.

Method 2000 receives the contoured elongate composite structure by a contoured elongate composite structure receipt and transportation system (operation 2004). The contoured elongate composite structure receipt and transportation system is configured to receive and support the contour of the contoured elongate composite structure. The contoured elongate composite structure receipt and transportation system is configured to be adjusted to support the contour as the contoured elongate composite structure is received.

Method 2000 transports the contoured elongate composite structure within a manufacturing environment by moving the contoured elongate composite structure receipt and transportation system within the manufacturing environment (operation 2006). Afterwards, the method terminates.

The contoured elongate composite structure receipt and transportation system moves within the manufacturing environment using a movement system of the elongate composite structure receipt and transportation system. The movement system takes the form of wheels, tracks, treads, or any other desirable movement assemblies.

In some illustrative examples, the contoured elongate composite structure receipt and transportation system comprises a structural frame, a plurality of moveable supports, a plurality of displacement systems connecting the plurality of moveable supports to the structural frame and configured to move the plurality of moveable support rollers relative to the structural frame, and a movement system connected to a base of the structural frame. In some illustrative examples, method 2000 further comprises lifting a conveyor belt of the contoured elongate composite structure receipt and transportation system holding the contoured elongate composite structure using a crane (operation 2008).

In some illustrative examples, method 2000 further comprises applying the contoured elongate composite structure to a composite skin using the conveyor belt (operation 2010). In some illustrative examples, the conveyor belt is used to apply pressure to the contoured elongate composite structure to lift the contoured elongate composite structure.

In some illustrative examples, method 2000 further comprises curing the composite skin and the contoured elongate composite structure to form a component of an aircraft (operation 2012). In some illustrative examples, the contoured elongate composite structure is a contoured composite stringer. In some illustrative examples, curing the composite skin and the contoured elongate composite structure forms a wing of an aircraft with a stringer co-bonded to the composite skin.

In some illustrative examples, the contoured elongate composite structure takes the form of a blade stringer having a T cross-section. In some illustrative examples, the conveyor belt can be used to lift the cured elongated composite structure by having a pair of support rollers on the opposing sides of the blade squeeze the blade. By applying pressure to either side of blade, the support rollers effectively constrain the blade between two conveyor belts. In these illustrative examples, rollers supporting the flanges of the blade stringer may then be withdrawn horizontally away from the top belt.

In some illustrative examples, rollers supporting the flanges are held by one piece of tooling while the rollers supporting the blade are held by a second piece of tooling. In some illustrative examples, the second piece of tooling is then separated from the first piece of tooling to position the blade stringer.

For example, the second piece of tooling may be lifted by an overhead crane and rotated 180° such that the blade is up and the base charge is facing down. The second piece of tooling may then moved such that the base charge is placed accurately on a wing skin.

In some implementations, the rollers supporting the flanges and the blade of the stringer are attached to the same piece of tooling, and after application of a pinching pressure by the rollers supporting the blade charge the entire piece of tooling may be lifted and rotated to the base down configuration. In other implementations, the contoured elongate composite structure receipt and transportation system is positioned beneath a composite skin. In these illustrative examples, the contoured elongate composite structure may be lifted using the plurality of moveable support rollers until the contoured elongate composite structure is in contact with the composite skin.

Figure 21:
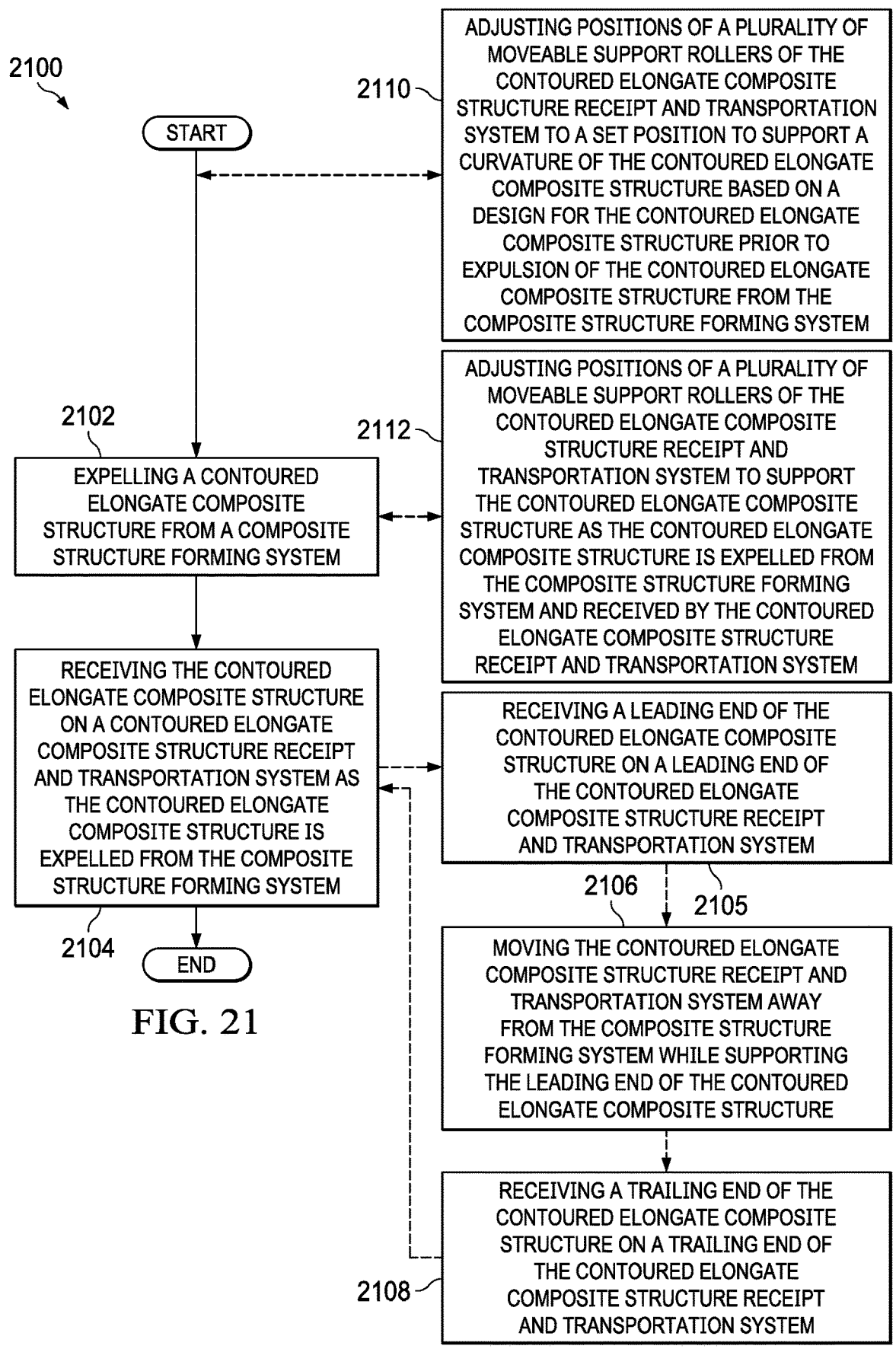
FIG. 21 is an illustration of a flowchart of a method for receiving a contoured elongate composite structure in accordance with an illustrative example.

Turning now to FIG. 21, an illustration of a flowchart of a method for receiving a contoured elongate composite structure is depicted in accordance with an illustrative example. Method 2100 may receive and transport contoured elongate composite structure 104 of FIG. 1. Method 2100 may be implemented using contoured elongate composite structure receipt and transportation system 106 of FIG. 1. Method 2100 may be implemented within manufacturing environment 200 using contoured elongate composite structure receipt and transportation system 206 of FIG. 2. Composite structure forming system 300 may be used to form a contoured elongate composite structure received and moved by method 2100. Charge forming station 402 of FIGS. 4-7 may be used to form a component of a contoured elongate composite structure to be received and moved by method 2100. A contoured elongate composite structure formed from plurality of composite charges in views 800-1210 of FIGS. 8-12 may be received and moved using method 2100. Method 2100 may be performed using contoured elongate composite structure receipt and transportation system 1406 of FIGS. 14-17. Method 2100 may receive and move a contoured elongate composite structure formed by method 1800.

Method 2100 expels a contoured elongate composite structure from a composite structure forming system (operation 2102). Method 2100 receives the contoured elongate composite structure on a contoured elongate composite structure receipt and transportation system as the contoured elongate composite structure is expelled from the composite structure forming system (operation 2104). Afterwards, the method terminates.

In some illustrative examples, method 2100 receives a leading end of the contoured elongate composite structure on a leading end of the contoured elongate composite structure receipt and transportation system (operation 2105). In some illustrative examples, method 2100 moves the contoured elongate composite structure receipt and transportation system away from the composite structure forming system while supporting the leading end of the contoured elongate composite structure (operation 2106). In some illustrative examples, moving the contoured elongate composite structure receipt and transportation system comprises moving the contoured elongate composite structure receipt and transportation system away from the composite structure forming system at a speed equal to an expulsion rate of the contoured elongate composite structure. Method 2100 receives a trailing end of the contoured elongate composite structure on a trailing end of the contoured elongate composite structure receipt and transportation system (operation 2108).

Method 2100 adjusts positions of a plurality of moveable support rollers of the contoured elongate composite structure receipt and transportation system to a set position to support a curvature of the contoured elongate composite structure based on a design for the contoured elongate composite structure prior to expulsion of the contoured elongate composite structure from the composite structure forming system (operation 2110). In some illustrative examples, method 2100 adjusts positions of a plurality of moveable support rollers of the contoured elongate composite structure receipt and transportation system to support the contoured elongate composite structure as the contoured elongate composite structure is expelled from the composite structure forming system and received by the contoured elongate composite structure receipt and transportation system (operation 2112).

Figure 22:
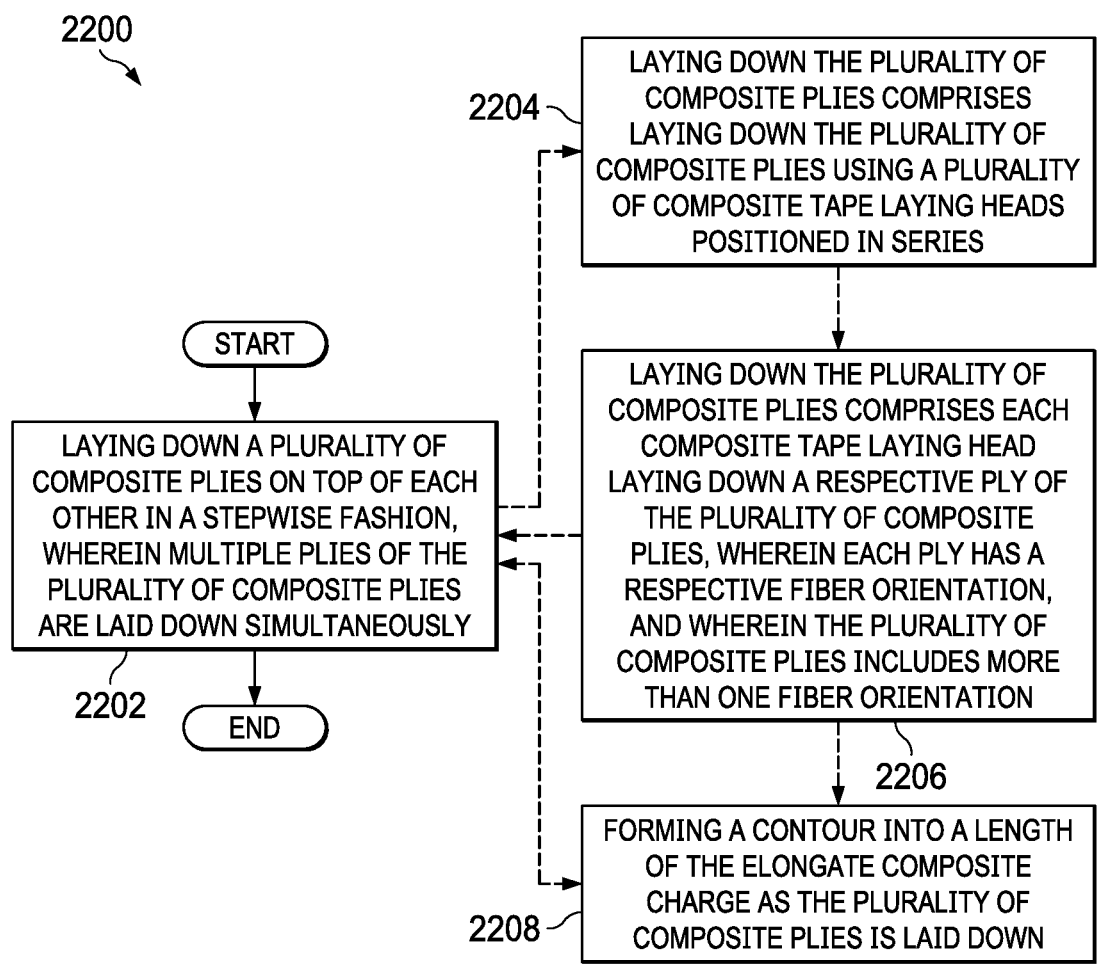
FIG. 22 is an illustration of a flowchart of a method for forming an elongate composite charge in a continuous process, the elongate composite charge having a plurality of composite plies, in accordance with an illustrative example.

Turning now to FIG. 22, an illustration of a flowchart of a method for forming an elongate composite charge in a continuous process, the elongate composite charge having a plurality of composite plies, is depicted in accordance with an illustrative example. Method 2200 may form any of base charge 118, second charge 124, or third charge 130 of FIG. 1. Method 2200 may be implemented using any of base charge forming station 114, secondary charge forming station 120, third charge forming station 126 of FIG. 1. Method 2200 may be implemented within manufacturing environment 200 using composite structure forming system 202 of FIG. 2. Composite structure forming system 300 may be used by method 2200. Charge forming station 402 of FIGS. 4-7 may be used to by method 2200. One of the plurality of composite charges in views 800-1210 of FIGS. 8-12 may be formed by method 2200.

Method 2200 lays down a plurality of composite plies on top of each other in a stepwise fashion, wherein multiple plies of the plurality of composite plies are laid down simultaneously (operation 2202). Afterwards, the method terminates.

In some illustrative examples, laying down the plurality of composite plies comprises laying down the plurality of composite plies using a plurality of composite tape laying heads positioned in series (operation 2204). In some illustrative examples, laying down the plurality of composite plies comprises each composite tape laying head laying down a respective ply of the plurality of composite plies, wherein each ply has a respective fiber orientation, and wherein the plurality of composite plies includes more than one fiber orientation (operation 2206). In some illustrative examples, method 2200 also forms a contour into a length of the elongate composite charge as the plurality of composite plies is laid down (operation 2208).

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

The flowcharts and block diagrams in the different depicted examples illustrate the architecture, functionality, and operation of some possible implementations of apparatus and methods in an illustrative example. In this regard, each block in the flowcharts or block diagrams may represent a module, a segment, a function, and/or a portion of an operation or step.

In some alternative implementations of an illustrative example, the function or functions noted in the blocks may occur out of the order noted in the Figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

In some illustrative examples, not all blocks of at least one of method 1800, method 1900, method 2000, method 2100, or method 2200 are performed. For example, operations 1808 through 1821 of FIG. 18 may be optional. As another example, operations 1908 through 1910 of FIG. 19 may be optional. As yet another example, operations 2008 through 2012 of FIG. 20 may be optional. As a further example, operations 2110 through 2112 of FIG. 21 may be optional. As another example, operations 2204 through 2208 of FIG. 22 may be optional.

Figure 23:
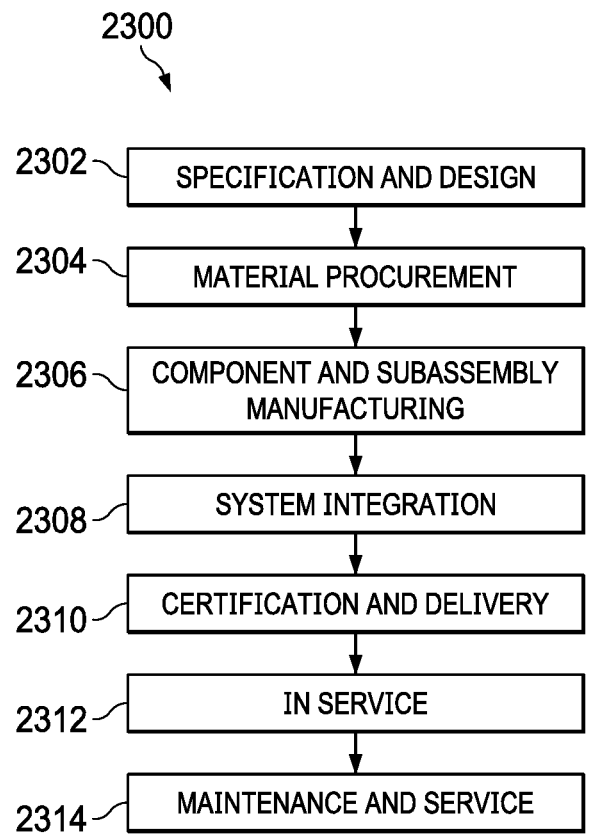
FIG. 23 is an illustration of an aircraft manufacturing and service method in the form of a block diagram in accordance with an illustrative example.
Figure 24:
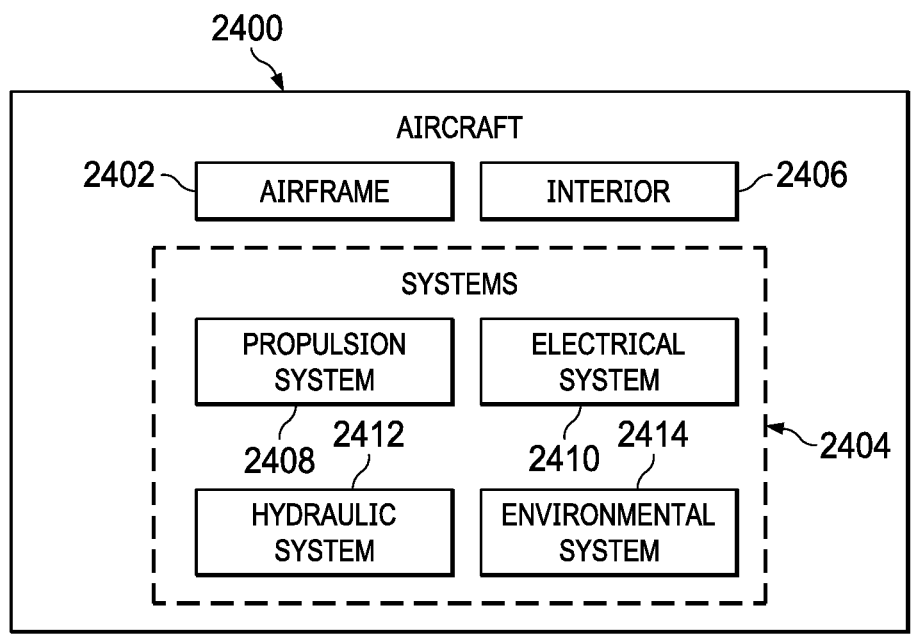
FIG. 24 is an illustration of an aircraft in the form of a block diagram in which an illustrative example may be implemented.

The illustrative examples of the present disclosure may be described in the context of aircraft manufacturing and service method 2300 as shown in FIG. 23 and aircraft 2400 as shown in FIG. 24. Turning first to FIG. 23, an illustration of an aircraft manufacturing and service method is depicted in accordance with an illustrative example. During pre-production, aircraft manufacturing and service method 2300 may include specification and design 2302 of aircraft 2400 in FIG. 24 and material procurement 2304.

During production, component and subassembly manufacturing 2306 and system integration 2308 of aircraft 2400 takes place. Thereafter, aircraft 2400 may go through certification and delivery 2310 in order to be placed in service 2312. While in service 2312 by a customer, aircraft 2400 is scheduled for maintenance and service 2314, which may include modification, reconfiguration, refurbishment, and other maintenance or service.

Each of the processes of aircraft manufacturing and service method 2300 may be performed or carried out by a system integrator, a third party, and/or an operator. In these examples, the operator may be a customer. For the purposes of this description, a system integrator may include, without limitation, any number of aircraft manufacturers or major-system subcontractors; a third party may include, without limitation, any number of vendors, subcontractors, or suppliers; and an operator may be an airline, a leasing company, a military entity, a service organization, and so on.

With reference now to FIG. 24, an illustration of an aircraft is depicted in which an illustrative example may be implemented. In this example, aircraft 2400 is produced by aircraft manufacturing and service method 2300 in FIG. 23 and may include airframe 2402 with a plurality of systems 2404 and interior 2406. Examples of systems 2404 include one or more of propulsion system 2408, electrical system 2410, hydraulic system 2412, and environmental system 2414. Any number of other systems may be included. Although an aerospace example is shown, different illustrative examples may be applied to other industries, such as the shipping industry.

Apparatuses and methods embodied herein may be employed during at least one of the stages of aircraft manufacturing and service method 2300. One or more illustrative examples may be used during component and subassembly manufacturing 2306, system integration 2308, or maintenance and service 2314 of FIG. 23. For example, contoured elongate composite structure 104 of FIG. 1 may be a component of aircraft 2400, during component and subassembly manufacturing 2306. Apparatuses and methods embodied herein may be employed in manufacturing at least one component of aircraft 2400. For example, contoured elongate composite structure 104 may be a component of one of airframe 2402 or interior 2406.

The illustrative examples provide a machine, the composite structure forming system, such as 102 or 202, that expels contoured elongate composite structures, such as uncured composite blade stringers. In some illustrative examples, the composite structure forming system expels contoured elongate composite structures, such as 104, according to model data provided to it.

In some illustrative examples, composite structure forming system (sometimes referred to as the Continuous Composite Stringer Machine (CCSM)) is static, staying in one place. In these illustrative examples, a co-designed and co-controlled Receipt Tool supports and moves the stringer coming out of the CCSM. In some of these illustrative examples, the composite structure forming system may deposit the composite structure, or stringer, directly onto a composite skin or other desired product. In these illustrative examples, the composite skin may be moved relative to the composite structure forming system as the stringer is expelled.

In other illustrative examples, the composite structure forming system may be moved within a manufacturing environment. In these illustrative examples, a composite structure receipt and transportation system 106, or product, or receipt tooling may be held stationary as the composite structure forming system is removed relative to the composite structure receipt and transportation system, or product, or receipt tooling.

The composite structure forming system (CCSM machine) (102) is comprised of three different kinds of sections. The composite structure forming system comprises a section comprising a number of charge layup stations (108), a noodle extrusion section (112), and a stringer assembly section (150). The number of charge layup stations simultaneously layup a number of charges. In the stringer assembly section, the number of charges (118, 124, and 130) and the noodle (154) are brought together to form the stringer (104).

This composite structure forming system greatly reduces the cost of fabricating composite wing stringers. The cost of fabricating composite wing stringers is reduced by at least one of reducing operator time, reducing the complexity of tooling, or reducing the complexity of moving completed contoured elongate composite structure.

The desired stringer comes out of the end of the machine (the composite structure forming system 102) as it is made. The desired stringer has not only a desired cross-section, but also a desired contour.

In conventional tape-laying processes for elongate structures, complex expensive tape-laying heads moveable along multiple axes are used. These conventional multi-axis tape-laying heads are often implemented on robotic arms.

The illustrative examples present a composite structure forming system with many more tape-laying heads but much simpler ones. With the greater quantity of tape-laying heads, the overall rate of production is much higher using the composite structure forming system of the illustrative examples.

By providing a contoured elongate composite structure receipt and transportation system moveable relative to the composite structure forming system, no crane moves are required. Further, by expelling the contoured composite structures, no crane moves are required.

In some illustrative examples, there are three charge layup stations (116, 122, 128) included in the composite structure forming system (CCSM): one for the forward charge of the stringer, one for the aft charge, and one for the base charge. Each of these charge forming stations operate in parallel. In some illustrative examples, all three charge forming stations are utilized to form a contoured elongate composite structure (104). In some illustrative examples, two of the three charge forming stations are utilized to form a contoured elongate composite structure.

In one illustrative example, the forward (124) and aft charges (130) of a composite blade stringer are laid up as L-shaped charges, while the base is laid up as a flat charge (118). In some illustrative examples, each of the stringer base, forward charge, and aft charge are comprised of between 5-49 plies of tape. The plies of a composite structure, such as a stringer may be oriented in any desired fiber orientations. In one illustrative example, each of the stringer base, forward charge, and aft charge are comprised of 0-, 90-, 45-, and −45-degree orientations with respect to the length direction of the stringer.

An individual stringer within an aircraft wing typically changes gauge using ply pad ups and drop offs throughout its length. For example, an individual stringer within an aircraft wing typically changes from medium thickness near the root of the wing, to heavier out some ways, to thinner near the tip of the wing.

A charge layup station, such as one of a base charge forming station, a forward charge forming station, or aft charge forming station may have any desired quantity of spooling heads. Each charge forming station desirably comprises a quantity of spooling heads sufficient to lay up any desired design of a charge of a stringer. When a charge may have up to 49 plies of tape, each charge forming station may comprise 49 or more individual spooling heads, each located at a fixed position, each capable of laying down tape.

A first ply of tape of a charge (118, 124, or 130) is laid down directly on a moving belt (138, 140, or 142), with subsequent plies laid atop that first ply. All tape is laid down in the direction of motion of the belt (and thus of the stringer charge). Each composite tape laying head (one of 116, 122, or 128) is loaded with a particular type of tape, such as tape with the fibers in the length direction of the tape (0 degree), tape with the fibers perpendicular to the length of the tape (90-degree), or fibers oriented ±45-degrees with respect to the direction of the tape. Each composite tape laying head is responsible for laying down one particular ply only and has the feed rollers and press roller to do so. Each composite tape laying head may be equipped with a cutter (e.g. guillotine cutter) so that it can cease laying down material when its ply drops off. In some illustrative examples, each composite tape laying head is equipped with an IR heater to provide tack between its ply and the material onto which it is laying down.

Each conveyor belt is supported quite rigidly beneath each composite tape laying head, to allow for some compaction pressure as is common for tape layup machines. The supports beneath the conveyor belt can be rollers to apply the pressure without mechanically opposing the conveyance of the belt.

The composite structure forming system is configured to form ply drop-offs, which generally occur within the charge laminate, not at the surface of the laminate. As the ply drop-offs generally occur within the charge laminate, the distance between the top of the last ply and the bottom of the first ply (the top surface of the belt) will change during layup. Each composite tape laying head of each charge forming station is configured to adjust its position up to 0.25" in one direction.

The composite structure forming system is configured to form contours into the expelled stringer. In some illustrative examples, the stringer base matches the contour of an aircraft wing. To form the contour into the elongate composite structure, each roller-and-head of each charge forming station is configured to translate vertically as a pair, throughout the layup of the elongate composite structure. The position adjustment may have any desired value. In some illustrative examples, the position adjustment can be as much as 2.5 ft. The position adjustment of each roller-and-head is accomplished by utilizing a conveyor belt rather than a rigid plate conveyance.

The L-charges are laid up on OML-type conveyor tooling, such that the outermost ply of the laminate is laid up first, and the ply interfacing the base, noodle, and other charge is the last ply laid.

The noodle extrusion section (112) of this machine is known as a noodle extruder or a noodle lamination machine, depending on whether a unidirectional noodle or laminated noodle is desired for a build. Such a machine extrudes the correct shape and volume of noodle for a given stringer design and is incorporated as one section of the CCSM. In some illustrative examples, the noodle extrusion section may be an extruding head on a mechanical arm. For the CCSM a stationary version that extrudes a noodle onto a moving belt is sufficient.

The stringer assembly section is where the stringer charges (118, 124, and 130) come together. The L-shaped forward and aft charges are fabricated linearly, on lines that are slightly off-parallel. After the last layup head, one or both of these lines are curved slightly to make the approach of these two lines gradual. Alignment features on the conveyor belts for the forward and aft charges are compared to adjust the relative positions of the two belts such that the composites touch together and are squeezed with some minor pressure, to form the blade. The extruded noodle is laid in the noodle gap. The base charge is lowered on top and pressed slightly, resulting in an uncured shape of a blade stringer. The conveyor for the base charge terminates prior to where the base charge contacts the flange charges; the last few inches of transport are unsupported. A separate roller is used to apply the mild pressure to the "top" ply of the base (which is the ply of the base that will contact the wing skin, usually counted as the first ply although it was the last ply laid by this machine).

This leads us to the front end of the machine, where the conveyors all turn around and this shape comes out. An uncured composite stringer (104) is coming out of the CCSM. Depending on the wing design, this stringer could be up to 100 ft long, and is built with a base that matches the contour of the wing. The stringer is desirably supported in a way that matches the contour of the wing, and that can move away from the CCSM as the (fixed in position) CCSM expels more stringer. In some illustrative examples, the special tool meant to receive this stringer may be referred to as an adjustable split conveyor belt.

In some illustrative examples, the CCSM (102) expels stringers in a blade-down configuration, so the tool is designed to support the weight of the stringer by its flanges, with a slit or gap to allow the blade room to hang. The tool does not press against the blade. The conveyor belts are supported by rollers that are at adjustable heights. As more of the stringer is expelled from the CCSM, the height of each roller is computer-adjusted so that the part is held in its correctly-contoured configuration as it is expelled.

The receipt tool (106) is parked, fixed with respect to the CCSM, so long as the CCSM is producing a given stringer. Once the stringer is complete, the receipt tool conveyor belt (168) stops rolling, the part remains fixed on the receipt tool (106), and the receipt tool is wheeled out to where the part is needed, such as for transfer to a cure tool. At least two receipt tools would be present for a CCSM to operate with a high duty cycle.

Oriented types of tape are commercial products that can be purchased today from "respoolers" which are companies that purchase material from our suppliers, cut the material, splice it, and spool it up to provide rolls of tape with fibers oriented in the desired direction.

Optionally, each composite tape laying head of the charge layup section may have a pair of splitting blades that can be used to ensure it lays down only the desired width of material. Alternatively, the entire stringer can be fed through a cutting station prior to exiting the machine.

One composite structure forming system (CCSM) (102) is configurable to form a variety of cross-sectional shapes of elongate composite structures. In some illustrative example, one composite structure forming system (CCSM) may be used to produce a variety of types of stringers for a specific model of aircraft. In some illustrative examples, one composite structure forming system (CCSM) may be used to produce a same style of stringer with different contours to match an aircraft wing. The composite structure forming system (CCSM) can be easily be reconfigured to a different model of airplane, as production rates for one model decreases and production rates for another increase.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A composite structure forming system configured to form a contoured elongate composite structure in a continuous process, such that the composite structure forming system comprises:
    a charge forming station that comprises a plurality of composite tape laying heads aligned in series; and
    a plurality of support rollers configured to provide support to a conveyor belt that lays between the plurality of composite tape laying heads and the plurality of support rollers, and is configured to support and transport a composite charge, such that each support roller of the plurality of support rollers is configured to move vertically along with an associated composite tape laying head in the plurality of composite tape laying heads.

2. The composite structure forming system of claim 1, the charge forming station configured such that a movement of a composite tape laying head in the plurality of tape laying heads and an associated support roller in the plurality of support rollers introduces a curvature into the composite charge.

3. The composite structure forming system of claim 1, wherein the plurality of support rollers comprises adjustable rollers configured to support the conveyor belt in a desired cross-sectional shape for the composite charge.

4. The composite structure forming system of claim 1 further comprising:
    a structure assembly region comprising a compaction roller, wherein the conveyor belt extends through the structure assembly region.

5. The composite structure forming system of claim 1, further comprising:

a structure assembly region configured to join a plurality of charges formed by a plurality of charge forming stations into the contoured elongate composite structure.

6. The composite structure forming system of claim 5, further comprising:
a composite noodle extrusion system, wherein the contoured elongate composite structure further comprises a composite noodle extruded by the composite noodle extrusion system.

7. A system configured to form a composite charge that comprises a plurality of plies of composite tape:
a charge forming station comprising a plurality of composite tape laying heads aligned in series; and
a conveyor system comprising a conveyor belt extending through the charge forming station and a plurality of support rollers, configured to provide support to the conveyor belt, such that each support roller of the plurality of support rollers is configured to move vertically along with an associated composite tape laying head of the plurality of composite tape laying heads.

8. The system of claim 7 wherein each composite tape laying head of the plurality of composite tape laying heads has a spool of composite tape, and wherein the plurality of composite tape laying heads has a plurality of fiber orientations of composite tape.

9. A method of forming a contoured elongate composite structure using a composite structure forming system, the method comprising:
forming a plurality of composite charges each comprising a plurality of plies of composite tape, via simultaneously using a plurality of charge forming stations of the composite structure forming system, the plurality of charge forming stations configured to operate in parallel, each charge forming station of the plurality of charge forming stations forming a respective composite charge of the contoured elongate composite structure, the composite structure forming system further comprising a plurality of conveyor systems, each conveyor system of the plurality of conveyor systems transporting, respectively, a composite charge on a conveyor belt laying between:
a plurality of composite tape laying heads aligned in series; and
a plurality of support rollers supporting the conveyor belt, each support roller of the plurality of support rollers is configured for moving vertically along with an associated composite tape laying head in the plurality of composite tape laying heads;
joining the plurality of composite charges to form the contoured elongate composite structure in a continuous process; and
expelling the contoured elongate composite structure from the composite structure forming system after joining the plurality of composite charges.

10. The method of claim 9, wherein forming the plurality of composite charges comprises laying down a plurality of ply drops and ply pad-ups using the plurality of plies of composite tape.

11. The method of claim 9, wherein forming the plurality of composite charges comprises forming a contour into one of the plurality of composite charges.

12. The method of claim 11, further comprising laying a composite noodle between the plurality of composite charges.

13. A composite structure forming system configured to form a contoured elongate composite structure in a continuous process, such that the composite structure forming system comprises:
a base charge forming station that comprises:
a first plurality of composite tape laying heads aligned in series; and
a plurality of support rollers configured to provide support to a base charge conveyor belt, such that each support roller of the plurality of support rollers is configured to move vertically along with an associated composite tape laying head of the first plurality of composite tape laying heads;
a base charge conveyor system having a base charge conveyor belt extending through the base charge forming station between the first plurality of composite tape laying heads;
a secondary charge forming station with a second plurality of composite tape laying heads in series;
a second charge conveyor system having a second charge conveyor belt extending through the secondary charge forming station and beneath the second plurality of composite tape laying heads;
a composite noodle extrusion system; and
a structure assembly region comprising a compaction roller configured to compact a base charge to adhere the base charge to a second charge and a composite noodle, the second charge conveyor belt extending through the structure assembly region.

14. The composite structure forming system of claim 1, wherein each composite tape laying head of the respective plurality of composite tape laying heads has a spool of composite tape, and wherein each respective plurality of composite tape laying heads has a plurality of fiber orientations of composite tape.

15. The composite structure forming system of claim 1, wherein each composite tape laying head of the respective plurality of composite tape laying heads has a respective compaction roller and a respective cutter.

16. The composite structure forming system of claim 1, wherein each composite tape laying head of the respective plurality of composite tape laying heads has a respective heater.

17. The composite structure forming system of claim 4, wherein a compaction nip is formed within the structure assembly region by the compaction roller and a number of support rollers.

18. The composite structure forming system of claim 4, wherein the conveyor belt ends prior to the structure assembly region.

19. The system of claim 7, wherein each composite tape laying head of the plurality of composite tape laying heads has a respective compaction roller, a respective cutter, and a respective heater.

20. The composite structure forming system of claim 13 further comprising:
a third charge forming station with a third plurality of composite tape laying heads aligned in series; and
a third charge conveyor system having a third charge conveyor belt extending through the third charge forming station and beneath the third plurality of composite tape laying heads.

21. The composite structure forming system of claim 20, wherein the second charge conveyor belt and the third charge conveyor belt provide pressure to adhere a third charge to the second charge in the structure assembly region.

22. The method of claim 9, wherein joining the plurality of composite charges comprises moving the plurality of composite charges through a structure assembly region by sending at least one conveyor belt of the plurality of conveyor systems through the structure assembly region.

23. The method of claim 22, wherein one conveyor belt in one of the plurality of conveyor systems ends prior to the structure assembly region.

\* \* \* \* \*